US010773898B2

(12) United States Patent
Perrot et al.

(10) Patent No.: US 10,773,898 B2
(45) Date of Patent: Sep. 15, 2020

(54) METHOD AND DEVICE FOR SEPARATING A STRING OF PACKAGES INTO SINGLE FILE AT A REGULATED PACE

(71) Applicant: FIVES SYLEPS, Lorient (FR)

(72) Inventors: Pascal Perrot, Meslan (FR); Philippe Le Sauze, Guidel (FR); Thierry Chollet, Lorient (FR)

(73) Assignee: FIVES SYLEPS, Lorient (FR)

(*) Notice: Subject to any disclaimer, the term of this patent is extended or adjusted under 35 U.S.C. 154(b) by 8 days.

(21) Appl. No.: 16/308,684

(22) PCT Filed: Jun. 14, 2017

(86) PCT No.: PCT/FR2017/051533
§ 371 (c)(1),
(2) Date: Dec. 10, 2018

(87) PCT Pub. No.: WO2017/216482
PCT Pub. Date: Dec. 21, 2017

(65) Prior Publication Data
US 2019/0161285 A1 May 30, 2019

(30) Foreign Application Priority Data
Jun. 16, 2016 (FR) .................................. 16 55628

(51) Int. Cl.
B65G 43/08 (2006.01)
B65G 47/31 (2006.01)
(Continued)

(52) U.S. Cl.
CPC ............. B65G 43/08 (2013.01); B65G 47/31 (2013.01); B65G 47/682 (2013.01);
(Continued)

(58) Field of Classification Search
CPC ...... B65G 15/10; B65G 47/31; B65G 47/682; B65G 43/08
(Continued)

(56) References Cited

U.S. PATENT DOCUMENTS 4,572,350 A * 2/1986 Besemann ............. B65G 47/53
198/370.07
5,746,572 A 5/1998 Winski
(Continued)

FOREIGN PATENT DOCUMENTS

DE    10 2013 206790 A1  10/2014
DE    10 2013 212900 A1  1/2015
WO    2014/017029 A1     1/2014

OTHER PUBLICATIONS

FR Search Report, dated Mar. 8, 2017, from corresponding FR application No. 1655628.
(Continued)

Primary Examiner — Douglas A Hess
(74) Attorney, Agent, or Firm — Nixon & Vanderhye

(57) ABSTRACT

Disclosed is a method for presenting in a longitudinal line packages initially arranged in rows i, at a determined isolated-package pace D, using at least a regulating conveyor belt and two line-forming conveyor belts. After separating rows adjacent in the longitudinal direction, rows are sequentially presented onto the regulating conveyor belt, the dimensions of the spaces between end packages of the row and the reference inside and outside dimensions with respect to the regulating conveyor belt and the number of packages on the belt are measured optically, the speed of the line-forming conveyor belts for maintaining the determined pace D is calculated, the paths of the packages are calculated and the moment at which to release the packages of row from the regulating belt onto the line-forming conveyor belts so that
(Continued)

the inside package of row i does not meet the outside package of row i−1 is determined.

15 Claims, 13 Drawing Sheets

(51) Int. Cl.
  *B65G 15/10* (2006.01)
  *B65G 47/68* (2006.01)
(52) U.S. Cl.
  CPC ............ *B65G 2201/0285* (2013.01); *B65G 2203/0233* (2013.01); *B65G 2203/0241* (2013.01); *B65G 2203/0291* (2013.01); *B65G 2203/041* (2013.01)
(58) Field of Classification Search
  USPC ............ 198/357, 418.7, 418.8, 419.2, 442, 198/457.03, 461.1, 575, 577, 579
  See application file for complete search history.

(56) References Cited

U.S. PATENT DOCUMENTS

| | | | | |
|---|---|---|---|---|
| 5,868,238 | A * | 2/1999 | Bonnet | B65G 13/10 198/370.09 |
| 6,609,607 | B2 * | 8/2003 | Woltjer | B65G 37/02 198/457.03 |
| 7,090,067 | B2 * | 8/2006 | Schiesser | B65G 15/22 198/395 |
| 7,137,502 | B2 * | 11/2006 | Carey | B65G 47/31 198/444 |
| 7,404,478 | B2 * | 7/2008 | Weber | B65B 25/06 198/457.03 |
| 7,607,533 | B2 * | 10/2009 | Pressler | B65G 47/682 198/779 |
| 7,896,151 | B2 * | 3/2011 | Meisinger | B65G 43/08 198/419.2 |
| 8,079,458 | B2 * | 12/2011 | Fleischmann | B65G 47/715 198/442 |
| 8,087,509 | B2 * | 1/2012 | Schmid | B65B 35/44 198/444 |
| 8,201,681 | B2 * | 6/2012 | Schiesser | B65G 43/08 198/460.1 |
| 8,360,230 | B2 * | 1/2013 | Rompe | G06T 7/0004 198/358 |
| 8,528,742 | B2 * | 9/2013 | Wargo | B65G 17/24 209/663 |
| 8,534,451 | B2 * | 9/2013 | Damen | B65G 47/682 198/347.4 |
| 8,612,050 | B2 * | 12/2013 | Lee | B65B 35/44 198/411 |
| 9,038,810 | B2 * | 5/2015 | Schroader | B65G 47/682 198/413 |
| 9,405,102 | B2 | 8/2016 | Asami | |
| 9,878,854 | B2 | 1/2018 | Walter et al. | |
| 10,087,022 | B2 * | 10/2018 | Vogelsang | B65G 15/64 |
| 10,315,859 | B1 * | 6/2019 | Zhao | B65G 47/31 |
| 10,501,269 | B2 * | 12/2019 | Walter | B65G 47/682 |
| 2001/0030102 | A1 | 10/2001 | Woltjer et al. | |
| 2004/0104100 | A1 | 6/2004 | Schiesser et al. | |
| 2011/0240439 | A1 | 10/2011 | Rompe | |
| 2018/0093835 | A1 | 4/2018 | Walter et al. | |

OTHER PUBLICATIONS

International Search Report, dated Oct. 10, 2017, from corresponding PCT application No. PCT/FR2017/051533.

\* cited by examiner

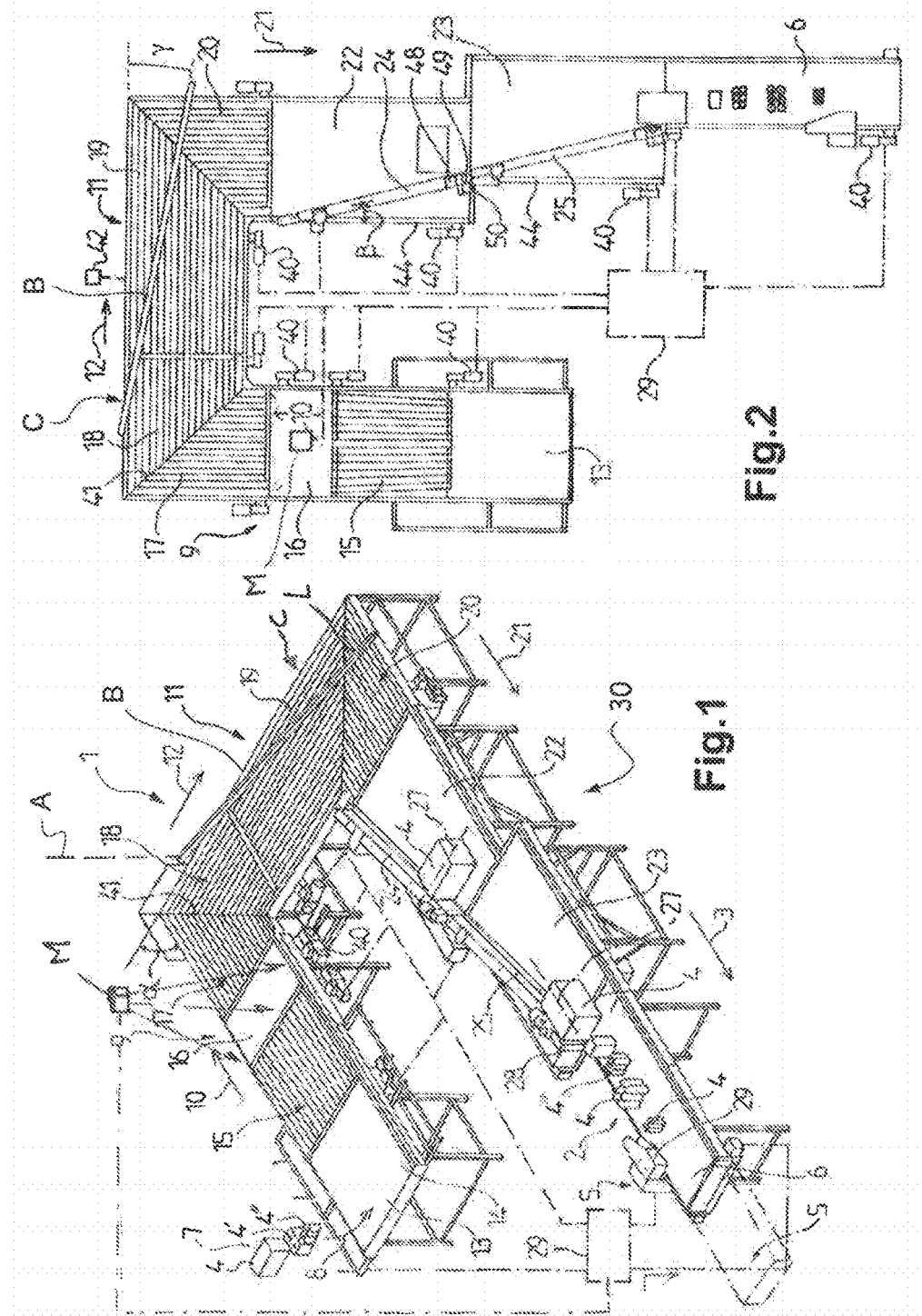

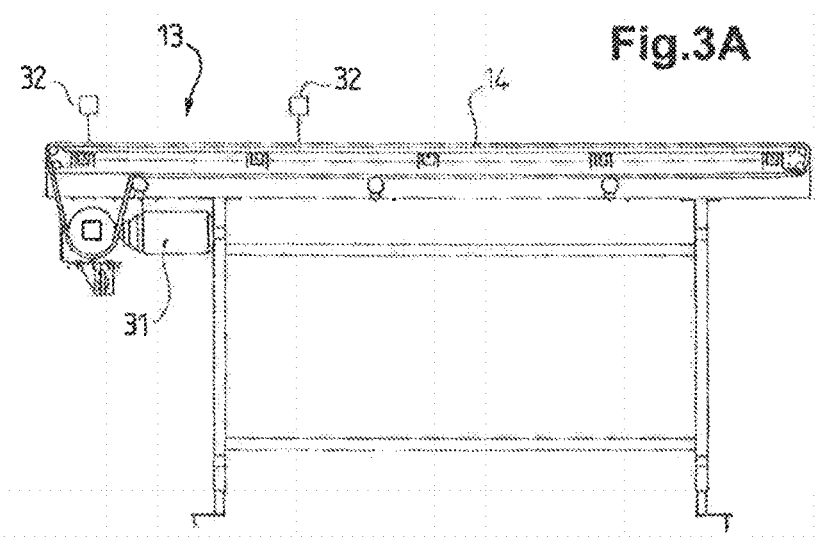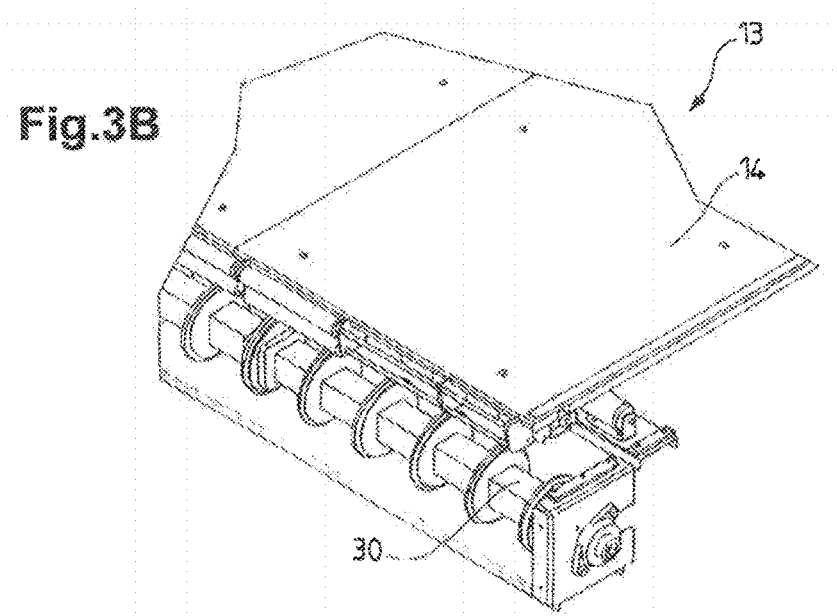

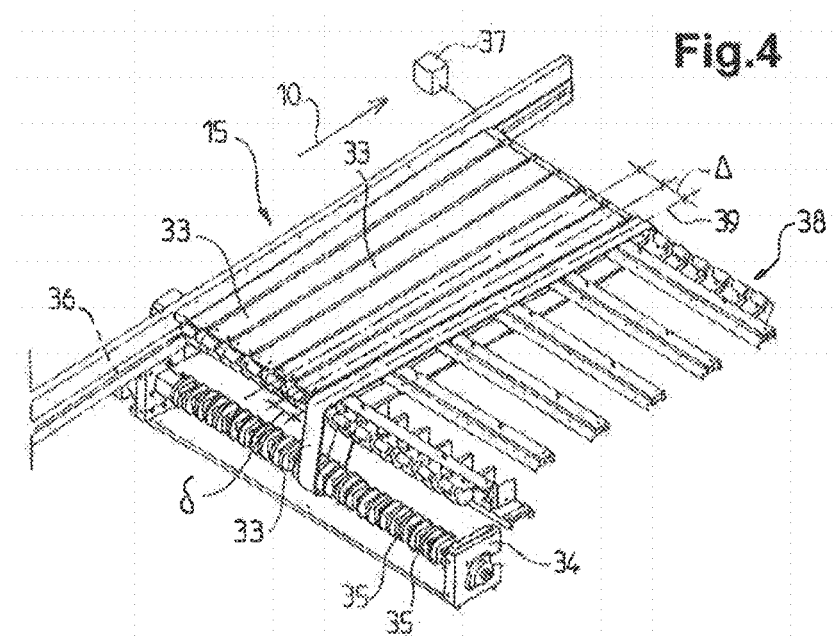
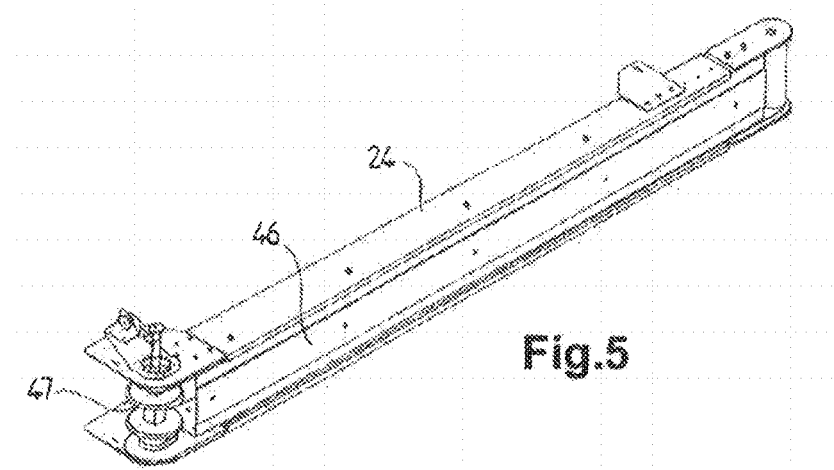

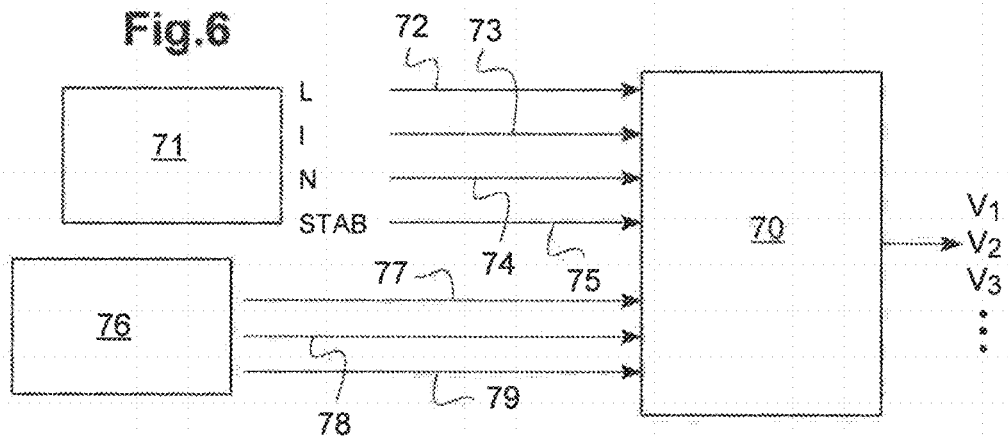
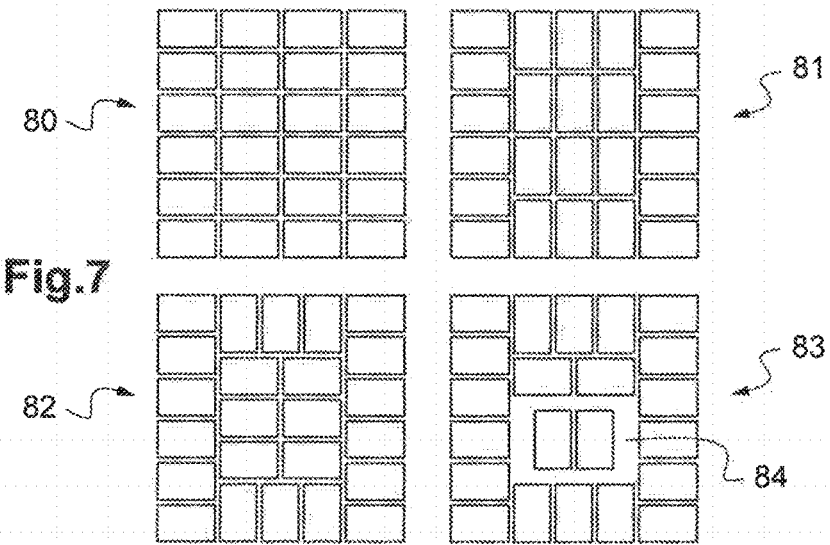
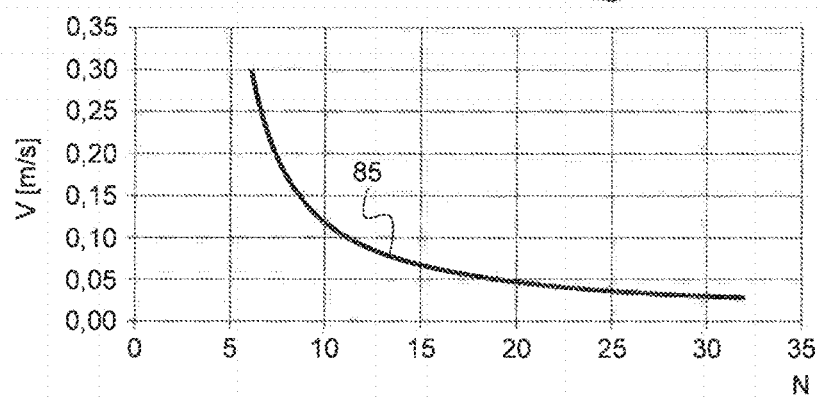

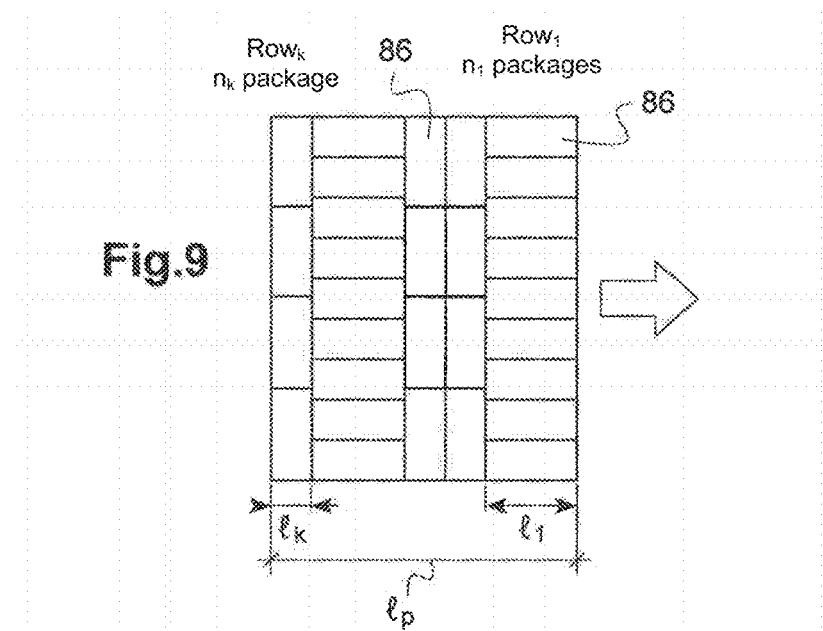
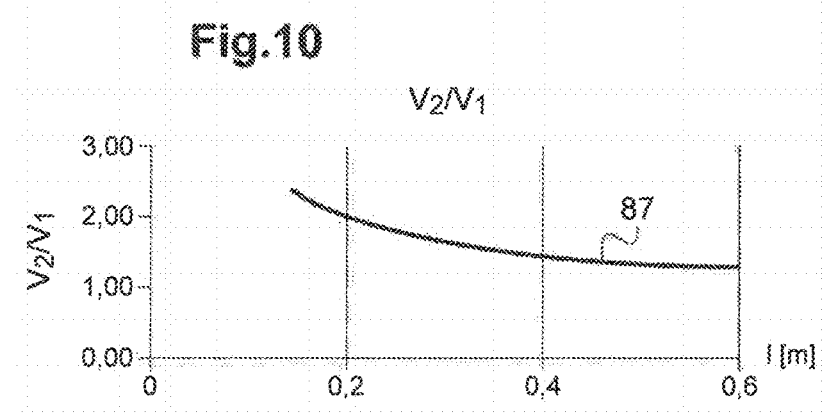

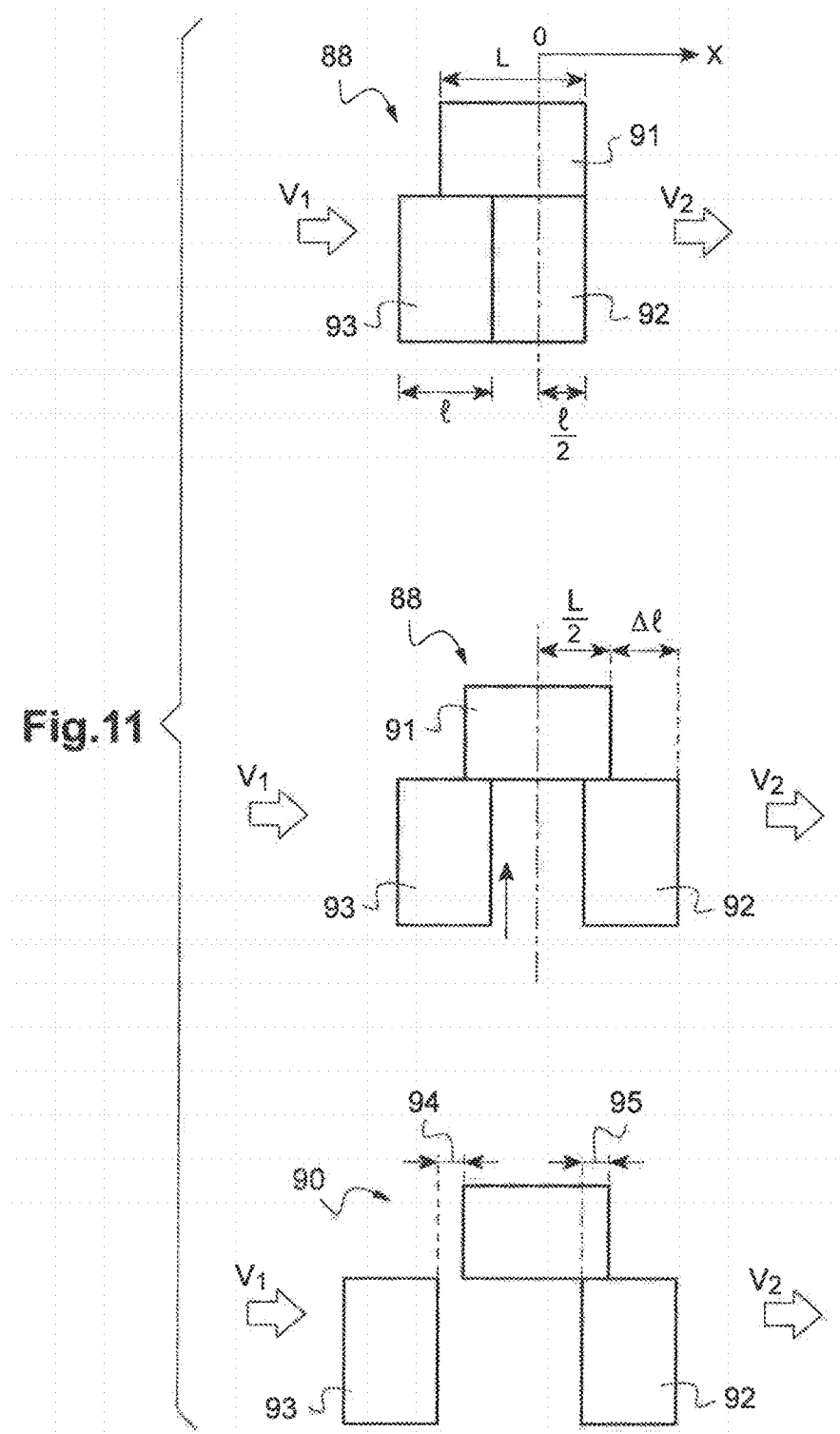

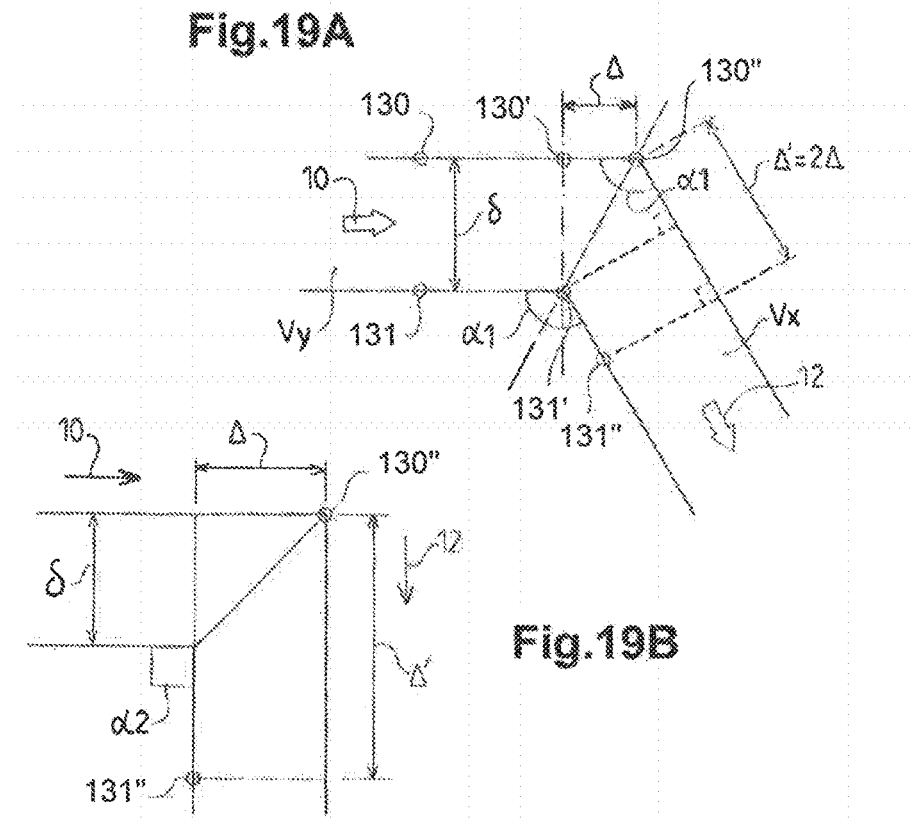
Fig.19A
Fig.19B
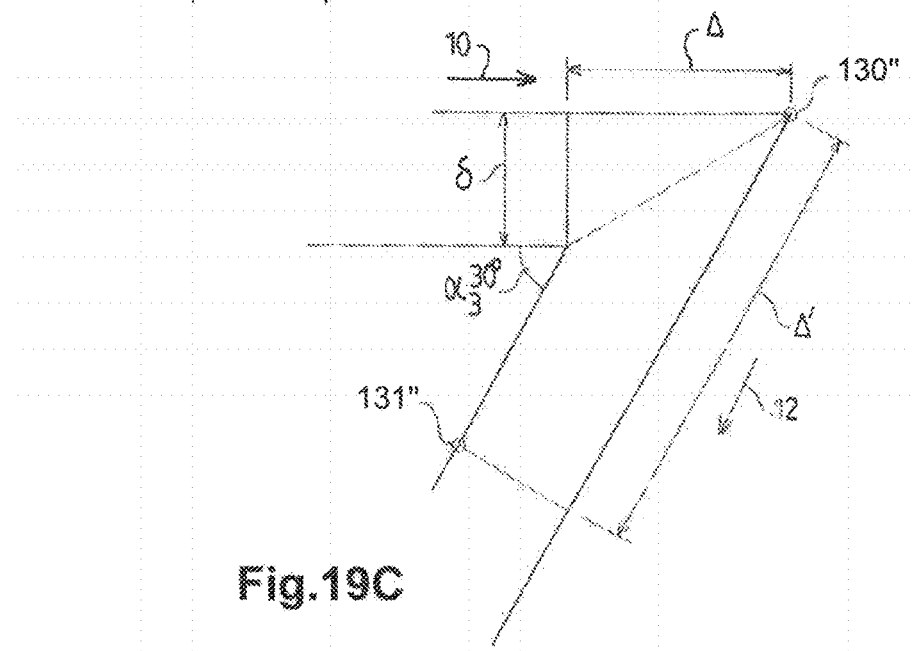
Fig.19C

METHOD AND DEVICE FOR SEPARATING A STRING OF PACKAGES INTO SINGLE FILE AT A REGULATED PACE

BACKGROUND OF THE INVENTION

Field of the Invention

This invention relates to a method for transferring and presenting packages in a single file, at a determined isolated-package pace.

It also relates to a package transfer device implementing such a method.

Description of Related Art

It has a particularly important, although not exclusive, application in the field of the separation of a string of loads having various shapes, i.e. the transfer and separation of loads from a layer of a variable number of packages, into a file of isolated packages. It specifically applies, in particular, to the case of loads that are not necessarily parallelepipeds, which have high centres of gravity and/or non-planar bottoms, which thus cause instability of the packages during their transfer.

Systems for transferring and presenting packages in a longitudinal file are already known. They use grippers to place the packages successively on a transfer belt for example, and/or use ram-jacks to straighten the packages into a single file as these progress on a belt.

However, such systems have numerous drawbacks. As a matter of fact, they require expensive actuators (clamps, ram-jacks, . . . ), which can fail and cause congestion, particularly in the lateral direction of the systems.

Methods are also known (WO 2014/17029 A; US 2001/0030102; DE 10 2013 206790A) for sorting and organizing package lines using belts with different speeds and/or different heights and/or orientations. Such systems do not take into account all the types of packages and in particular the packages having high centres of gravity that may tip over during transport.

They do not make it possible to achieve high paces (in particular above 1,500 packages per hour), nor the processing of pallet layers with interleaved products, i.e. the distribution of which is organised in a non-homogeneous way. In particular in the case of interleaved packages, rates above 1,000 packages/hour are impossible to achieve with prior art methods.

It is known that, when making up a pallet of products or packages, these can be organized in homogeneous rows, or on the contrary interleaved in whole or in part, one inside the other, according to the optimization of the filling of the pallet the overall dimensions of which must be maintained within determined volume limits. The interleaving and/or increase in the packages processing rates then generate(s) traffic jams and/or collisions between same, which results in a stop or a bad stringing, which considerably limits the processing rates.

The present invention aims in particular to overcome such drawbacks by providing a method and a device that better meet the requirements of practice than those previously known, in particular in that it allows optimized sorting and presentation of packages in a simple, efficient and fast way (for example, over 1,700 packages per hour, for example, 1,800 or 2,000 or even 2,200 packages/hour), without any risk of error and/or unintentional jamming at a particularly low cost, even in the case of unstable packages and/or packages obtained from pallets the layers of which have a distribution of products or packages in interleaving rows.

With the invention, the number of actuators is reduced, which reduces the risk of failure, maintenance costs and therefore simplifies the operation of the unit.

Thanks to the invention, the packages can also be supplied by a less sophisticated pallet unloading system with high paces (not dependent on too long a time chart due to the actuators).

BRIEF SUMMARY OF THE INVENTION

The present invention is based in particular on a different idea, consisting in making the packages naturally string, thanks to special arrangements of the belts or conveyors on which the packages to be transferred are placed and move and thanks to a calculated and regulated management of the supply and the respective speed of each of the belts.

To this end, the invention provides in particular a method for transferring and presenting in longitudinal or substantially longitudinal file the direction of their transfer, of packages initially arranged in rows i ( . . . , n−1, n, n+1, . . . ) in a direction transverse to the direction of transfer, at a determined isolated-package pace D, by at least three successive conveyor belts, namely a regulating conveyor belt and two line-forming conveyor belts, in which after separating from one another rows that are adjacent in the longitudinal direction, each row i is presented in turn onto the regulating conveyor belt, the dimensions of the spaces between the end packages of said row i and the internal and external reference dimensions with respect to said regulating conveyor belt and the number of packages of row i on said conveyor belt are measured by optical measuring means, from said measurements and using calculation means, the speed of the line-forming conveyor belts for maintaining the determined pace D is calculated, the paths of the packages are calculated and the moment at which to release the packages of said row i from the regulating belt, onto said line-forming conveyor belts is thus determined, as a function of said calculations so that the inside package of row i does not catch up with the outside package of row i−1 and said row i is advanced on the line-forming conveyor belts at the moment of release so determined.

In advantageous embodiments, one or more of the following arrangements are also/further used:

to separate the adjacent rows in the longitudinal direction, the packages are deposited in horizontal layers, with each layer comprising at least two packages of rows i, i+1, on a first receiving conveyor belt transporting the packages together in a first direction at a pre-determined first speed $V_1$, and then these packages are advanced on a second conveyor belt for transfer in the first direction at a second speed $V_2 > V_1$, with the regulating belt, of sequenced speed $V_3$, forming a third belt located downstream of said first and second belts;

the speed $V_1$ is chosen according to the number N of packages in the layer packages of at least two adjacent rows are interleaved;

the speed ratio $V_2/V_1$ is chosen according to the dimensions of the packages in length L and in width l, and a determined spacing dimension E of separation or minimum gap between packages, with the spacing dimension E or minimum gap being the one that is desired to be systematically respected between two adjacent packages of two different adjacent rows (to prevent any subsequent collision during the rest of the process);

the row i+1 is advanced on the second belt only when all the packages of the previous row i have reached a specific determined position with respect to the entry on said second belt;

the line-forming conveyor belts comprising a fourth conveyor belt driven at a fourth speed $V_4$ (determined so as to increase the separation in the longitudinal direction of said rows or series from each other, and a fifth conveyor belt forming an angle a with the first direction and driven at a speed $V_{5r}$ in a second direction, said fourth and fifth conveyor belts are supplied, so that the path length of the packages, which were initially located in the direction transverse to the first direction is different;

the fourth belt is supplied by conditioning the speed $V_4$ and the speed $V_5$ of the fifth belt on the number of packages of row i present on the third belt and on the relative position of the end packages of said row i with respect to the reference inside and outside dimensions;

each package located beyond a determined distance from the inner edge of the fifth belt is straightened by a guide ramp B at an angle y to the transfer direction, so that said packages are brought back inside said fifth belt;

the angle α ranges from 90° to 150°;

the packages are advanced on at least one additional conveyor assembly, in a third direction or substantially in a third direction forming a second angle with the second direction of the fifth belt;

each package is straightened with respect to a determined horizontal plane in an identical position for gripping by at least one motorized guide ramp, obliquely to the transfer direction at an acute angle β to one of the edges of the conveyor and a pivoting system is actuated if necessary, in order to position the packages always in the same direction with respect to their longitudinal axis.

The invention also provides for a device implementing the method as described above.

It also provides for a device for transferring and presenting isolated packages in a longitudinal line in the direction of the transfer thereof at a determined pace D, to a package pick-up station, where the packages are deposited in layers, with each layer comprising at least two rows (i, i+1) of transverse packages in the direction of transfer, comprising a first receiving conveyor belt transporting the packages together in a first direction at a first speed $V_1$, a second conveyor belt for the transfer in said first direction at a second speed $V_2 > V_1$, so that a separation results in the longitudinal direction between a first row i or a first transversely aligned series, of at least one package and at least one second row i+1 or a second series, transversely aligned, of at least one package due to the difference in speed, a third belt movable in translation in a sequenced manner to be stopped prior to supplying a fourth belt, means for optically measuring the X-Y positions of the packages of said row i or series, with the number of packages of said row i and the spacing between same and/or separating the end packages of the internal and external sides of the third belt, when stationary, means for advancing the third belt at a third speed $V_3$, and stopping same in a sequenced manner (i.e. successively or intermittently by specific programming), a fourth belt positioned as an extension of the third belt, so arranged as to be driven at a determined fourth supplying speed $V_4$ of a fifth belt forming an angle with the first direction and so arranged as to be driven at a speed $V_{5r}$, in a second direction, so that the path length of the packages initially located in the direction transverse to the first direction is different, said fifth belt and means for calculating the speeds $V_1$, $V_2$, $V_3$, $V_4$, $V_5$, and stops of the third belt and for determining the moment of introduction of the packages onto the fourth belt from determined parameters including the dimensions of the packages, the length of the belts, the number of packages per layer, as well as the spacing dimensions and the number of packages per row i measured optically, so as to allow separating a string of packages into a longitudinal or substantially longitudinal line of packages, at a determined isolated-package pace D and without any risk of collision during the transfer thereof.

Advantageously it comprises an additional conveyor assembly for a transfer in a third direction or substantially in a third direction forming a second angle with the second direction of the fifth belt.

Also, advantageously the fifth belt comprises a ramp oblique to the direction of transfer, for guiding the packages.

The optical measuring means arranged to measure the number of packages of the series or row i that will travel on the fourth belt and the spacing dimensions or gaps between the end packages of said series and the reference inside and outside dimensions with respect to the third belt comprise a CCD camera (e.g. 176 pixels×132 pixels).

For example, the latter is located above the belt at a distance H sufficient to encompass the width of the belt at specified opening angles x0x and y0y, for example 60° and 45° respectively.

The invention will be better understood by reading the embodiments given below as non-exhaustive examples.

BRIEF DESCRIPTION OF THE SEVERAL VIEWS OF THE DRAWING(S)

This invention refers to the accompanying drawings in which:

FIG. 1 is an axonometric perspective view of a device implementing the method according to one embodiment of the invention.

FIG. 2 is a top view of FIG. 1.

FIGS. 3A and 3B respectively are a side and a partial perspective view of the first conveyor belt in FIG. 1.

FIG. 4 is a partially exploded perspective view of one embodiment of the second conveyor belt of the device in FIG. 1.

FIG. 5 shows an example of an (oblique) guide ramp that can be used in one embodiment of the invention, such as the one shown in FIG. 1.

FIG. 6 is a block diagram illustrating the initial steps for calculating the speed of the belts.

FIG. 7 illustrates four examples of palletized package layers showing different types of interleaving, or no interleaving.

FIG. 8 gives a curve illustrating the result of the calculation of the speed $V_1$ of the first belt according to the number of packages.

FIG. 9 is a top view showing a palletization plane with packages arranged differently but not interleaved.

FIG. 10 shows a curve illustrating, in one embodiment of the invention, the speed ratios $V_2/V_1$ between the first and second belts according to the width l (and/or length) of the packages.

FIG. 11 is a top view of the path of three initially interleaved packages, which are partially deinterleaved thanks to the ratio $V_2/V_1$ of speeds between belts.

Figure 12:
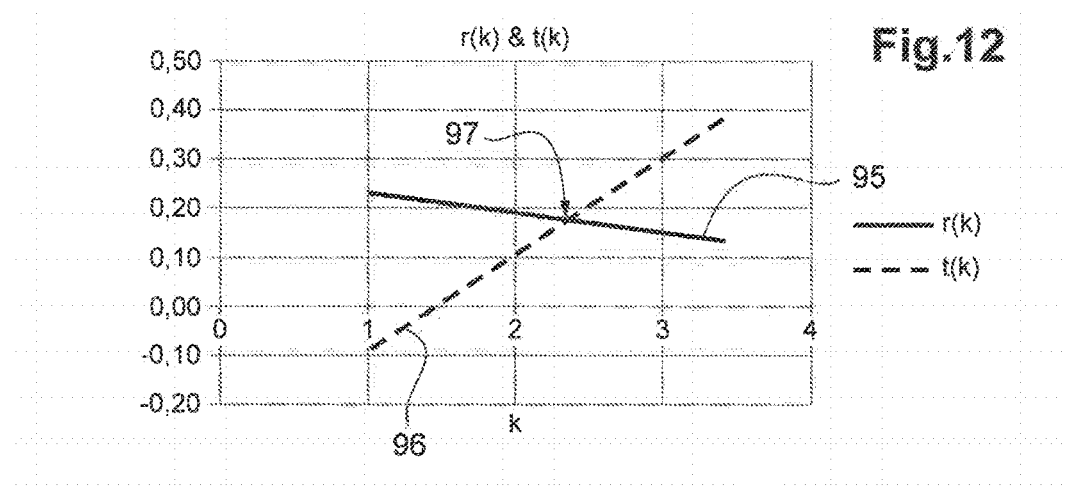

FIG. 12 shows a curve for determining the optimal value of the ratio between the speed $V_2$ of the second belt and the speed $V_1$ of the first belt, allowing the optimization of the deinterleaving.

Figure 13:
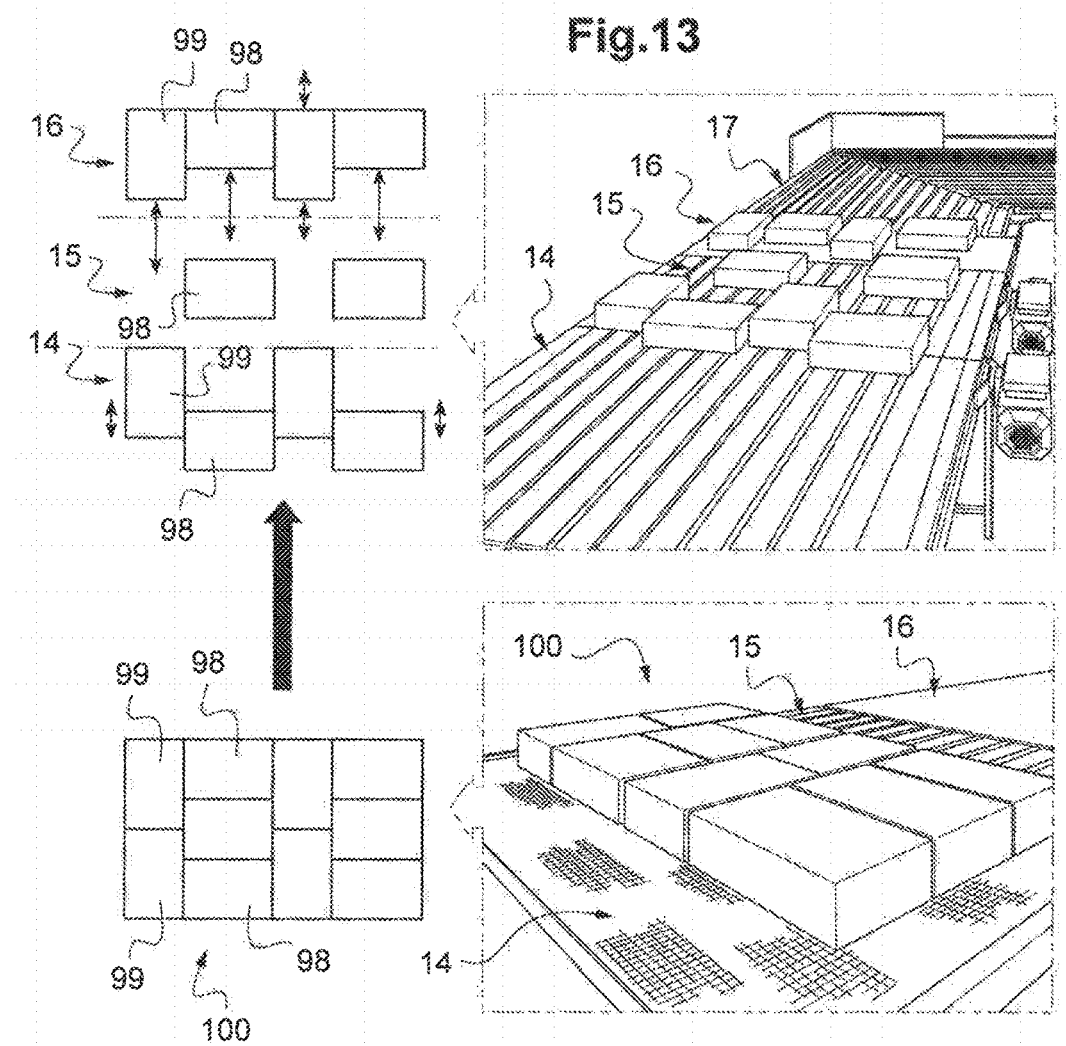

FIG. 13 is a schematic top and perspective view of an initial position of a palletized layer of interleaved packages at the first conveyor belt, and a partially deinterleaved final position of the packages at the first, second and third conveyor belts.

Figure 14A:
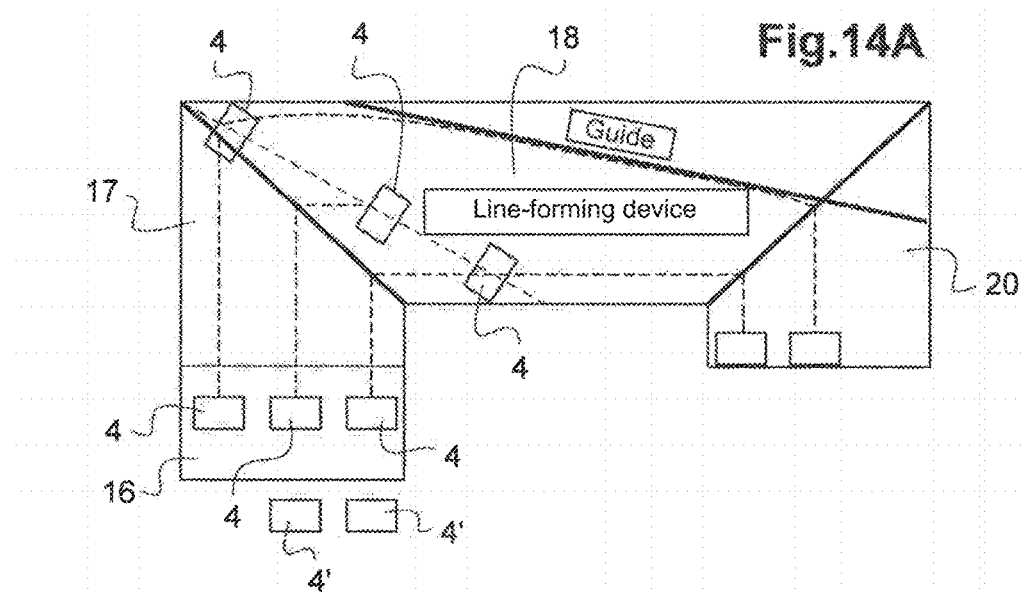
Figure 14B:
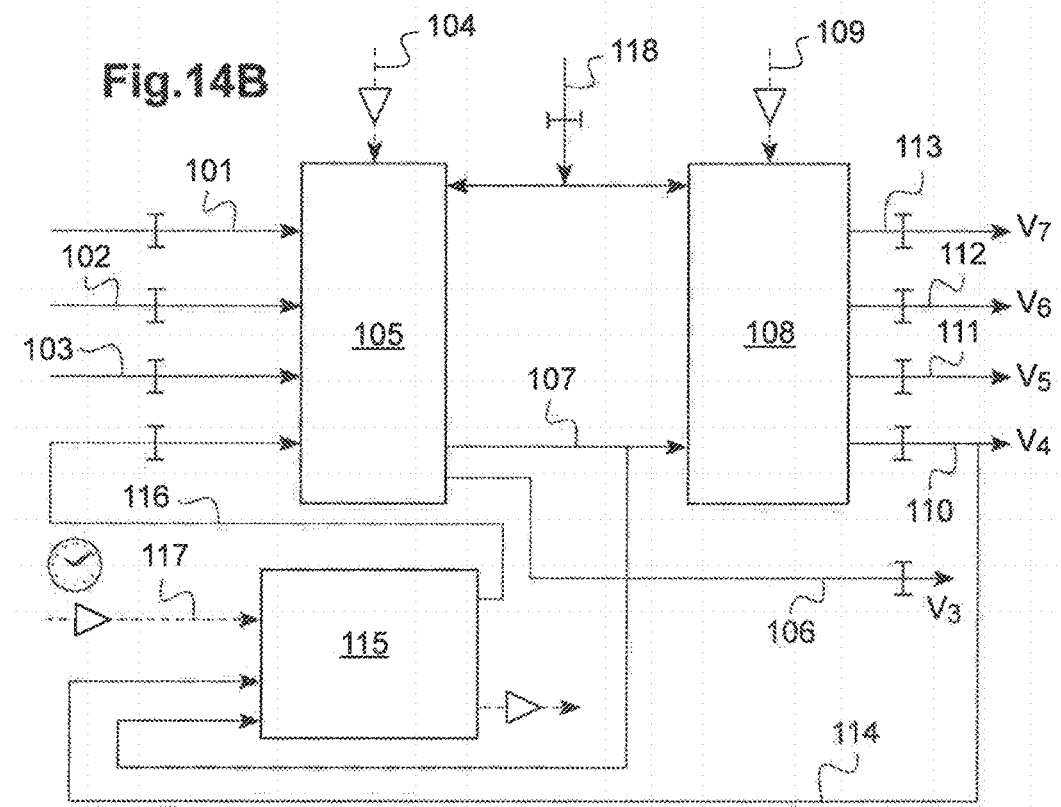

FIGS. 14A and 14B respectively represent, on the one hand, a top view of the third and fourth belts, as well as the following conveyors or belts, and on the other hand, a block diagram illustrating the control of said belts.

Figure 15:
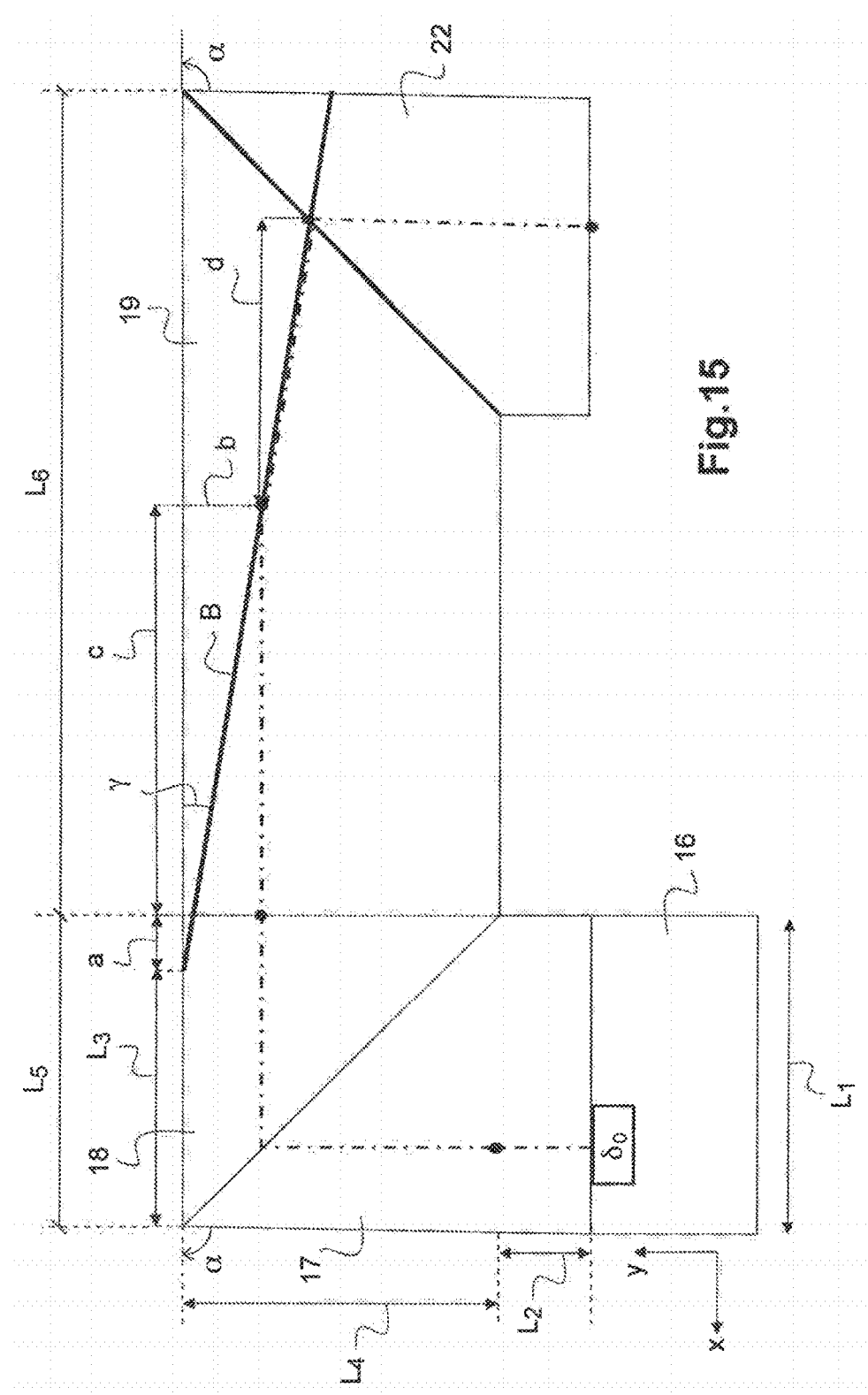

FIG. 15 is an enlarged view of FIG. 14A illustrating the path of a package according to its initial position at the exit of the third conveyor belt, according to the embodiment of the invention more particularly described here.

Figure 16:
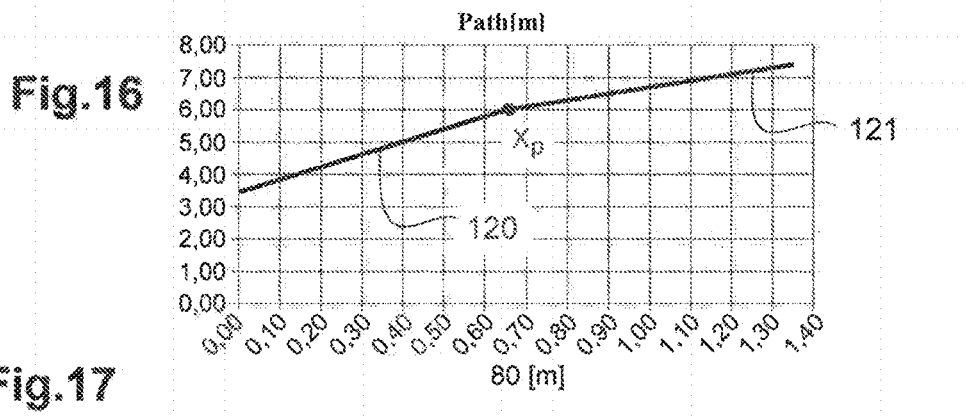

FIG. 16 is a curve showing the length of the path followed by a package from the initial Ox coordinates thereof at the exit of the third belt with the belt system of FIG. 15.

Figure 17:
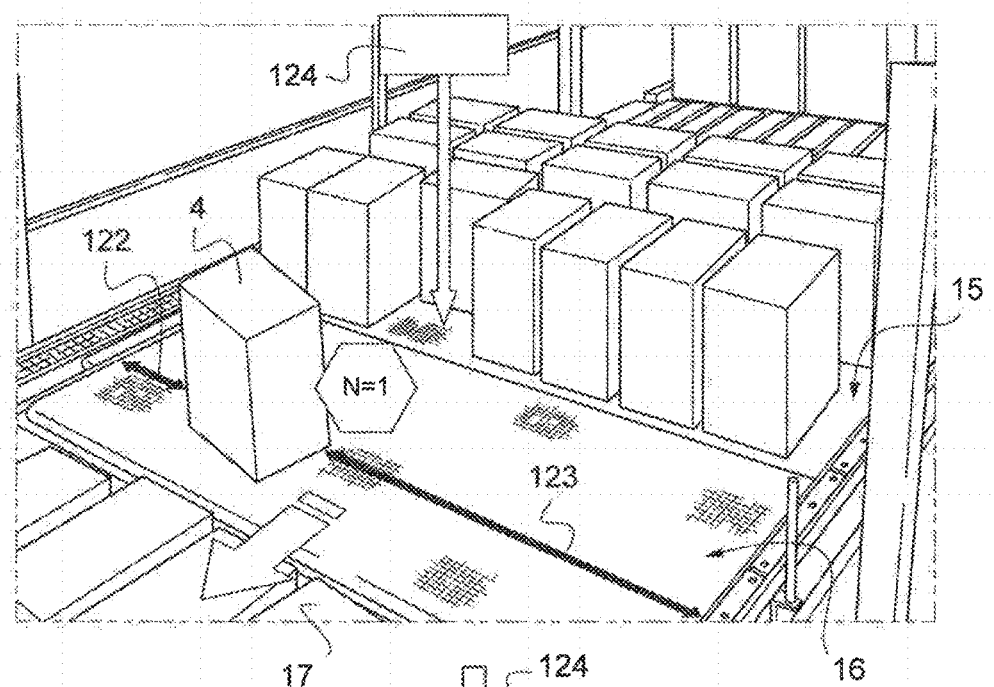

FIG. 17 is a schematic view in perspective of the third conveyor belt at the optical measurement level.

Figure 18:
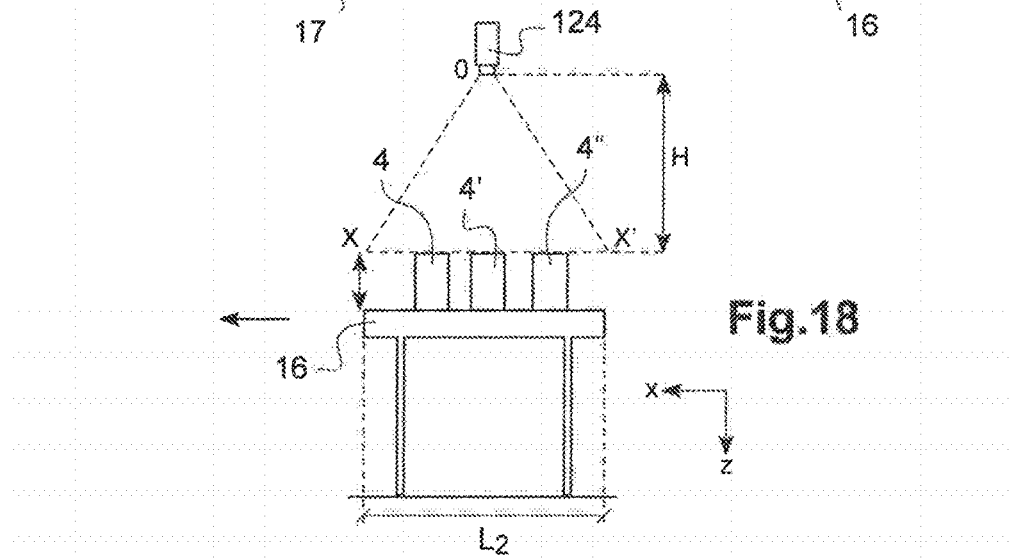

FIG. 18 is a schematic elevation view of the third belt with optical measuring equipment of FIG. 17.

FIGS. 19A to 19C illustrate three types of angles between the fourth and fifth belts, according to the various embodiments of the invention.

FIGS. 20A to 20D show, in perspective, four steps of the package transfer showing the progressive alignment thereof according to the embodiment of the invention more particularly described here.

DETAILED DESCRIPTION OF THE INVENTION

FIG. 1 shows a device 1 implementing a method for transferring and presenting into a single file 2, i.e. a longitudinal or a substantially longitudinal line in the direction of the transfer 3 thereof, packages 4, 4', 4" to a pick-up station 5 for example consisting of a conveyor table 6 which will then allow the picking-up of the packages in a manner known per se through the use of clamps and/or any other suitable means.

The packages 4, 4', 4" are brought in horizontal layers 7 in a manner known per se (arrow 8) onto a first conveyor assembly 9 transporting the packages in a first direction or substantially in a first direction (arrow 10) onto a second conveyor 11 for transferring said packages in a second direction 12 forming an angle α with the first direction 10 so that, as will precisely be disclosed in reference to the following figures, the length of the paths of the packages initially located in the direction transverse to the first direction is different, which, with the other characteristics of the invention will allow the packages to be separated into a longitudinal or a substantially longitudinal line.

In the embodiment more particularly described here, the first assembly 9 comprises a reception table 13 formed by a first belt or conveyor 14 which will be described more precisely with reference to FIGS. 3A and 3B, so arranged as to be driven at a first speed $V_1$.

In general, the terms belt and conveyor will be considered as equivalent throughout the description.

The first assembly 9 also comprises at least a second belt 15 so arranged as to move the packages in first, for example parallel or divergent, directions as more precisely described in FIG. 4, at a speed $V_2 V_1$, so that the difference in speed leads to the separation of successive rows.

In the presence of divergent belts, the linear speed of the packages of the same row is slightly different.

This second belt can also be so arranged (or not) as to move the packages at different speeds via belts also travelling at different speeds $V_2, V'_2, V''_2 \ldots$.

The first assembly 9 also comprises, positioned after the second assembly 15, a third belt 16, with a sequenced speed $V_3$ for example, higher than the speed of the parts upstream of the first assembly with a number of stops greater than or equal to 1.

According to one embodiment of the invention more particularly described here, the third belt comprises optical means M which will be more particularly described below, with reference to FIGS. 17 and 18.

The device in FIG. 1 further comprises a fourth (corner) belt 17 belonging to the first conveyor assembly 9 which is the one that will be in contact, with no break of load, with the second conveyor assembly 11 forming the angle a, here of 90°, with the direction 10 of the first assembly 9 which corresponds to the direction of travelling of the packages.

"No break of load" means a continuous travelling of the packages from one conveyor belt to another, without same being picked-up by lifting means and/or without any sudden vertical drop in height.

The fourth belt 17 consists of belts parallel to the direction 10 having identical continuous width and constitution (e.g. seventeen modular belts), all around a rotating gear and having a gradual length in the outward direction. All these belts are driven at the same speed.

On conveyors 16 and 17, each load of the same row thus travels at the same linear speed.

In the embodiment described here, the second conveyor assembly 11 comprises a fifth corner belt 18, then a sixth belt for example consisting of several central belts 19 which will in turn be in contact with a third conveyor assembly 20 transferring the packages in a third direction 21, forming a second angle α, here also 90° (for example) with direction 12.

The third conveyor assembly 30 comprises a seventh corner belt 20 and a series of two downstream conveyor belts transporting the packages in the same direction 21, namely a first rectangular belt 22 and a second rectangular belt 23, for example identical to the first one.

Each of these belts, for example, consisting of parallel belts operating in the same way as belt 14, but having different sizes, has a guide ramp 24, 25 on the side, which guides the packages.

These ramps are, for example, motorized as will be described while referring to FIG. 5.

The successive belts or conveyors of each of the assemblies 9, 11 and 30 are, as shown in FIGS. 1 and 2, in line with each other.

In addition, at their junction, the second belt 15 coincides with the first belt 14, with the width thereof in the transverse direction being approximately identical.

The same applies to the third belt 16 and the second belt 15, to the fourth belt 17 and the third belt 16, to the sixth belt 19 and the fifth belt 18.

Similarly, the successive conveyors 20 and 22 have a width (taken in the transverse direction) that is approximately identical at the junction thereof and coincide with each other.

On the other hand, the two belts 22 and 23 are slightly offset from each other at the junction thereof and only partially coincide.

In addition, as shown in FIGS. 1 and 2, there is no break of load between two successive conveyors and not only between the fourth belt 17 and the fifth belt 18.

At the exit of the last conveyor belt 23, the packages are now arranged in a single file on table 6, for receiving and sending to the package pick-up station 5.

More precisely, the table 6 has, at its end, a system capable of pivoting the load or the package 4 (if necessary) so as to always place it in the same direction with respect to its longitudinal axis 27.

The pivoting system 26 consists, for example, of a removable stop, which is inserted when the measurements made by an optical sensor 28 allow it. The sensor will determine, on the basis of a preliminary programming which will be explained in greater details below, whether it is necessary to pivot the unit using control means 29 known per se (PLC).

Table 13 will now be described more precisely with reference to FIGS. 3A and 3B.

The supply of the device as indicated above is carried out here using a depalletizing system in charge of depositing the layer 7 of packages 4, 4', 4" . . . (from a pallet) onto the receiving belt 14.

The layer 7 may be complete or incomplete, with the overall dimensions thereof being, for example, within an area defined by the standards currently applied in logistics, namely 1,200×800 mm$^2$ or 1,200×1,000 mm$^2$. It is preferably complete so that it can be handled by mechanical means.

It consists of at least two rows of packages 4, 4', 4" . . . which may have different orientations.

This variation in orientation can be observed between consecutive rows or within the same row.

One or more rows can also be interleaved, with such interleaving having been initially done to optimize the storage plans, while minimizing lost volumes and/or crossing the layers so as to improve the pallet stability.

The receiving table 13 is made from a belt (or first conveyor belt) 14 in the form of an endless chain consisting of plastic links in a way known per se.

The dimensions of this table are larger than those of the received layer, with the belt 14 being endless and meshed all around a shaft 30 (see FIG. 3B) driven by a geared motor 31, in a way known per se. It makes it possible for loads to be transferred at a speed, for example of the order of 0.5 m/s.

An optical device, for example, consisting of four photoelectric sensors 32, provides the marking of the area, thus informing the power supply system of the PLC 29 of the occupancy status of the table 14.

With reference to FIG. 4, a part 15 of the first conveyor assembly 9, called the intermediate part, was then represented, which makes it easier to distinguish the packages.

For example, it is made from thirteen modular 33 belts, similar in design to but thinner than the previous belt 14. Here again these belts are mounted on a (same) shaft 34, equipped with gears 35, driven by a (single) geared motor 36.

In this embodiment, the initial transverse distance $\delta$ between the longitudinal axis of each of the belts gradually increases over the entire stroke to reach a distance $\Delta$ at the end of the stroke as shown in FIG. 4 (with for example $\Delta-\delta=100$ mm or 96 mm).

In this embodiment only the central belt is located axially in the direction of travel and strictly parallel to the direction 10.

The other twelve belts symmetrically implanted on either side (six on each side) of the central belt, therefore take an increasingly divergent direction with respect to the axis of travel.

Such a provision ensures a better segregation of packages or loads along two axes.

A first separation along the axis 10 of load displacement 10 is achieved by the difference in speed applied between the first input belt and the second belt.

For example, this difference can be of the order of 2 and naturally causes a longitudinal distance or play (or gap) between two consecutive rows. A photoelectric sensor 37 placed at the end 38 of this intermediate conveyor part then detects the space between two packages.

A second separation along the axis normal to the travel is due to the divergence between each of the belts.

This divergence naturally creates a distance or play transverse to the travel between each of the loads of the same row (up to the value $\Delta-\delta$).

In the embodiment of the invention more particularly described here, a third belt 16 is provided (see FIGS. 1 and 2).

This third belt 16, for example with a length (taken in the direction of transfer of packages) substantially twice as short as the length of the second belt 15 of the first conveyor assembly (upstream), is made from a modular belt having a design similar to or identical with the previous belts, for example of the type of those of the conveyor part 13 (belt 14) described above.

A single geared motor 40 of the same type as the other geared motors driving the belts is also provided, and so arranged as to apply a difference in speed of about 1.7 for example here with the second belt 15 and allow successive stops and restarts.

The presence of this row as well as the detection of its transfer is carried out by a CCD optical camera placed directly above the third belt as detailed below and in combination with PLC programming which will also be explained below.

According to the embodiment of the invention more particularly described here, the previously isolated row is then transferred to the second conveyor assembly 11.

This assembly includes two conveyor parts, namely a first part or fifth belt 18 which forms a 90° angle with the fourth belt 17 of the first conveyor assembly, which allows a bevelled junction 41 (see FIGS. 1 and 2).

This bevelled junction ensures the continuity of the transfer, i.e. a transfer without break of load, and here materializes the bisector of the 90° angle.

It then includes a second part or sixth conveyor belt 19 of this second conveyor assembly 11, formed by parallel belts of the same type as those described above and allows the packages to be moved a little further towards a third conveyor assembly 20 which will be described below.

In the example described more precisely here, the two conveyor parts 18 and 19 are made from seventeen modular belts having a design similar to the previous ones, installed parallel to each other and guided in grooves provided in a plastic material support.

All these belts are mounted on the same shaft driven by a geared motor, again in a manner known per se, ensuring a movement of loads at for example an approximate speed between 15 m/min and 40 m/min, for example of 24 m/min.

An identical linear speed is thus applied to each load of the same row.

When transferring at 90° between the end of the first conveyor assembly and the beginning of the second conveyor assembly 18, the path to be covered by each of the loads is substantially variable as will be specified in reference to FIGS. 20A to 20D below.

As a matter of fact, if it is desired to characterize the position of each of the loads, it can be retained that the closer the initial position to the vertex of the angle, the longer the path the load will have to travel.

As it is assumed that the linear velocity applied to each of the loads is the same, it can be noted that each load completes its travel in a time proportional to the distance to be covered, thus creating, upon completion of the transfer, a shift in position between each of them which will result, thanks to the regulated management of the other parameters and as will be described below, in the linear alignment thereof, as can be seen for example in FIG. 20D.

Then only one row remains (being put in a single file) on all the conveyors.

As the area has a complex shape, it is marked by an optical sensor, for example a laser scanning sensor 42 (see FIG. 2), the coverage of which is adaptable.

The second assembly further includes a straight bar B, of the motorized guidance type, extending over part or the entire length of said second assembly, for the complementary guidance of end packages. The bar is fixed on one side on the outer side C of the second assembly to an axis A located on the first assembly side, about which it is rotationally adjustable (angle γ) and includes on the other side a free end L.

The free end L is therefore adjustable in position, with the bar making it possible to move the packages located too far outside inwardly, which enables a better management of the flow of packages separated in a single file.

The angle γ is adjusted to the speeds, dimensions and number of packages to be aligned.

In the embodiment of FIGS. 1 and 2, a third 90° conveyor assembly is therefore installed thereafter to obtain a perfect line.

An angle part, symmetrical and identical to the angle part 17, is provided.

As for the alignment of the loads, it is completed by two belt conveyors 22, 23 (or belts), for example identical to each other, with an approximate length of 2.50 m for example.

Each belt, similar in type to belt 14, is equipped with a motorized, independent vertical guide 24, 25, with an acute angle β relative to one of the edges or sides 44 of the conveyor, for which the selection of the right or left side will determine the reference plane of the alignment.

Advantageously, the angle β can be adjusted manually or using a motor, in a programmed way, according to the speeds and dimensions of the packages to be aligned from an initial storage pallet.

The action of the guides is maintained over the entire length of each belt 22, 23, with the guides being placed one behind the other.

The second belt 23 is offset along the axis transverse to the movement, so as to ensure continuity of the alignment action over a distance of 5 m, for example.

The first conveyor 22 takes care of the alignment of the loads with the shortest paths, with the second one realigning the other loads if necessary.

With reference to FIG. 5, Guide 24, 25 includes a vertical endless belt 46 moving longitudinally in a manner known per se about an axis 47 driven by a geared motor (not shown).

The orientation of the loads is provided here by belt conveyors with a length of approximately 3 m. These conveyors are driven by motor means 48, 49, 50 known per se and therefore arrange the packages in the transverse or longitudinal direction. When leaving the conveyor 23, the loads are taken up by the table 6 and oriented by the system 26. The function of this sub-assembly is to ensure a single orientation lengthwise, for example, for all the loads.

To do this, three basic operations are planned, namely measuring the length of the object, comparing this measurement with theoretical data stored in the memory of the PLC 29 and reversing the load if necessary using a ram-jack (not shown).

The length of the load is measured, for example, as follows:

the load 4 enters the conveyor 6 and activates the photoelectric cell forming the optical sensor 28.

the control system (PLC 29) then stores the position of the load 4 given by said sensor 28.

As soon as the load no longer occludes the photoelectric cell, the PLC 29 stores the position of the load 4 again.

The length of the load is then obtained by simply subtracting the two previously stored values.

The resulting value is then compared with the expected theoretical value. If the difference is not zero (within one tolerance) then the load is reversed.

As a matter of fact, the real-time tracking of the position of the load on the conveyor 22 makes it possible for a mechanical actuator to exert a force at a precise point of said load (in this case the first corner thereof), if so required.

With reference to FIG. 6, and according to the embodiment of the invention more particularly described here, each conveyor belt (14, 15, 16 . . . ) of the device 1 is a discrete variable, that can be modified in real time, of the system to be designed according to input data linked to the initial data 71 on packages and layers, namely:

length L of the package (arrow 72), e.g. 0.2<L<0.6 m width l of the package (arrow 73), for example 0.145 m<l<0.4 m the number N of packages in one layer (arrow 74)

a piece of data characterizing the stability of the product (arrow 75) STAB=(Stab, Not stab)

and based on the data 76 optically measured on belt 16 using the CCD camera, namely:

the gap between the outer side or outer edge of the third belt and the outer face opposite the outermost end package of the device (arrow 77)

the gap between the inner side or inner edge of the third belt and the face opposite the innermost end package of the device (arrow 78)

the number of packages in the series of packages ready to leave to belt 17 (arrow 79).

From such initial data, the PLC 29 will be able to calculate the speeds $V_1$, $V_2$ . . . of the various belts be by to obtain the desired jamming-free line-forming at pace D of isolated packages.

FIG. 7 shows four exemplary types of layers 80, 81, 82, 83 which respectively give four pallet interleaving arrangements, which can also be entered as data into the system 70 to optimize the row deinterleaving.

More precisely, the layer 80 is a simple plane with, for each row, the packages in the same direction (no interleaving).

The layer 81 shows an arrangement of medium complexity with two different package directions.

The layer 82 gives a complex arrangement wherein the notion of homogeneous row no longer exists.

The layer 83 gives a plane wherein some packages are not under pressure, leaving gaps 84 between packages in the centre of the layer.

Determination of the speed $V_1$ of the first belt 14:

The principle of speed control consists in adapting the speed $V_1$ of this belt so that the package pace D it provides is fixed and independent of the number of packages N in the layer.

$$T_{cycle} = T_{Removal} + T_{evac}$$

$$T_{cycle} = \frac{3600N}{D}$$

$$T_{evac} = \frac{l_{Tot}}{V_1}$$

$$l_{tot} = 1.5 * \text{Width\_Palet}$$

$$V_1 = \frac{1.5 * \text{Width\_Palet}}{T_{Cycle} - T_{Removal}}$$

For the calculation, a lower limit is provided If N<7 then N:=7

Example of a Digital Application
D=1,800 C/hr
Tcycle=2 N(s)
Width Pallet=1 meter
$T_{Removal}$=7 Sec $$V_1 = \frac{15}{2N-7} * \frac{N}{k_0}$$

With ko being a constant depending on the palette

FIG. 8 shows a curve 85 showing the speed $V_1$, which therefore depends on the number N of packages per layer, according to the exemplary numerical application above.

Determination of the speeds $V_2$ and $V_3$ of the second and third belts, for a longitudinal separation of the rows or series of packages between the second and third belts:

The purpose of separation is to obtain longitudinally separated rows or series of packages of a configurable length, i.e. a spacing E between the packages or a determined minimum gap.

In general, a row (or a series) of packages is defined as a set of packages that is contained within a transverse rectangular area, i.e. extending perpendicular to the direction of transfer of the packages.

When the rows are separated, a given row is separated from the adjacent rows. In other words, the areas corresponding to two adjacent rows do not overlap.

Within the same row, the packages may be more or less distant from each other (see row 15 and rows 14 and 16 in FIG. 13).

A distinction is made here, for example between two possible palletising levels:

With no interleaving Pal plane:=(Simple, Mean Complexity)

With interleaving Pal plane:=(Complex),

Interleaving is here limited to two rows, i.e. a package cannot belong to more than two rows.

Either:

$$l < L \le 2 \cdot l$$

$$1 < \frac{L}{l} \le 2$$

In the case of a pallet loading plane of not interleaved packages (not interleaved rows $n_1, \ldots n_h$) corresponding to FIG. 9 and of width $1_1, \ldots 1_h$ the minimum gap (Mgap) is expressed as follows:

$$M_{gap} = [\mu(\,i_{k+1}\;\;l_k\,)\,|\,l_k]\begin{pmatrix} V_2 \\ V_1 \end{pmatrix} 1)$$

With: $\mu \in [0 \ldots 1]$ Coefficient reflecting the length of the product required on the second belt to reach $V_2$.

$V_2$ is determined in the most critical case, namely to obtain a determined Mgap (min gap) between two consecutive rows conveyed along the width 1.

In this case, we have:

$$l_k = l_{k+1} = l_{min}$$

$$V_2 = V_1\left(1 + \frac{M_{gap}}{l_{min}}\right)$$

A digital application gives for example and if so desired, a 20 cm Mgap (min gap):

We have $1_{min}$=14.5 cm and
We get: $V_2$=$V_1$*2.38

FIG. 10 shows an example of a $V_2/V_1$ curve 87 obtained according to the package width 1 and corresponding to the example described above.

In the case of a palletization plane for interleaved packages (of the same type as the layer 82 in FIG. 7), an initial state 88 ($t_o$), an intermediate state 89 ($t_1=t_{o+}\Delta t_o\Delta$) and the final state 90 of three packages 91, 92 and 93 were represented (see FIG. 11).

In the final state, the packages 91 and 93 are separated by a gap 94, while maintaining an overlapping 95 between the loads 91 and 92.

As regards the intermediate state 89, we will have:

$$A\; t = t_0$$

$$X_1(t_0) = \frac{l}{2}$$

$$X_2(t_0) = \frac{l}{2}$$

$$X_3(t_0) = \frac{l}{2}$$

$$A\; t = t_1$$

$$X_1(t_1) = \frac{l}{2}$$

Let a distance covered by the package 91 in a time be $\Delta\tau_1$:

$$\Delta l_1 = V_1 \cdot \Delta\tau_1 = X_1(t_1) - X_1(t_0) = \frac{L-l}{2}$$

During this same time $\Delta\tau_1$, the package 92 travelled on a distance $\Delta l_2$:

$$\Delta l_2 = V_2 \cdot \Delta\tau_1$$

$$X_2(t_1) = \frac{l}{2} + \frac{V_2}{V_1} \cdot \frac{L-l}{2}$$

After a time $\Delta\tau_1$, the package 93 will have travelled a distance of $\Delta l_3$:
$\Delta l_2 = V_1 \Delta\tau_1$
Either $$\Delta l_2 = \Delta l_1 = \frac{L-l}{2}$$

Or $$X_3(t_1) = \frac{L - 2 \cdot l}{2}$$

Discussion of the position of $X_3(t_1)$
We have: $L < 2.1$ therefore $$X_3(t_1) = \frac{L - 2 \cdot l}{2} < 0$$

The package 93 is therefore on the first belt still.
More precisely and in the case of a strict interleaving, the package 93 is exactly or approximately exactly at the junction of the two belts 14 and 15. The longitudinal deviation thus created is equal to:

$$\Delta l_{21} = \Delta l_2 - \Delta l_1 = (V_2 - V_1) \cdot \Delta\tau_1 = \frac{L-l}{2} \cdot \left(\frac{V_2}{V_1} - 1\right)$$

The condition for maintaining the interleaving of the packages 91 and 92 is then:
$\Delta l_{21} < l$
If:

$$V_2 < V_1 \cdot \frac{L+l}{L-l}$$

The following borderline cases can also be observed:
$L=2.1$ (strict interleaving) $V_2 > 3.V_2$
$L$-$\iota$ (Square-based products)
In this case $V_2$ takes too high a value, making interleaving difficult or even impossible.
A $t=t_2$ $$X_3(t_2) = \frac{l}{2}$$

Let a distance covered in a time $\Delta\tau_3$ be:

$$\Delta l_3 = V_1 \cdot \Delta\tau_2 = X_3(t_2) - X_3(t_1) = \frac{3l - L}{2}$$

During this same time $\Delta\tau_3$ the package 91 travelled on a distance $\Delta l_1$:

$$\Delta l_1 = V_2 \cdot \Delta\tau_2$$

$$X_1(t_2) = \frac{L}{2} + \frac{V_2}{V_1} \cdot \frac{3l-L}{2}$$

The longitudinal deviation thus created during $\Delta\tau_2$ is thus equal to:

$$\Delta l_{31} = X_1(t_2) - X_3(t_2) = \frac{L-1}{2} + \frac{V_2}{V_1} \cdot \frac{3l-L}{2}$$

The condition for deinterleaving the packages 91 and 93 is then:
$\Delta l_{31} > L$
If:

$$V_2 > V_1 \cdot \frac{L+l}{3 \cdot l - L} \text{ or } V_2 > V_1 \cdot \frac{\frac{L}{l}+1}{3 - \frac{L}{l}}$$

The following borderline cases must also be taken into account:
$L=2.1$ (strict interleaving)
$V_2 > 3.V_1$
In this case $V_2$ takes too high a value, making interleaving difficult or even impossible. The equation of the overlapping $r=f(k)$, which can be used in the calculations according to the embodiment of the invention more particularly described here, is shown below.
Let us set $$k = \frac{V_2}{V_1}$$

The overlapping r is then expressed by the relationship
$r = l - \Delta l_{21}$
either $$r(k) = l - \frac{L-1}{2}(k-1)$$

Or $$r(k) = -k\left(\frac{L-l}{2}\right) + \left(\frac{L+l}{2}\right)$$

This relationship is therefore a straight line 95 (FIG. 13) with a negative slope.
The equation of the gap t(k) is expressed by the relationship
$t = \Delta l_{31} - L$
either $$t(k) = \frac{L-1}{2} + k\left(\frac{3l-L}{2}\right) - L$$

Or $$t(k) - k\left(\frac{3l-L}{2}\right) - \left(\frac{L+l}{2}\right)$$

Here again its representation is a straight line 96, but this time with a positive slope Numerical Example $L=0.320$ m, $l=0.235$ m
$r(k)=-0.0425k+0.2775$
$t(k)=0.1925k-0.2775$ There is therefore an optimal value 97 of k=k$_{opt}$ such that r(k)=t(k).
If:

$$k_{opt} = 1 + \frac{L}{l}$$

This optimal value of k corresponds to:
an optimal value of the overlap r$_{opt}$=r(k$_{opt}$)
an optimal value of the hole t$_{ops}$=t(k$_{opt}$)
So that:

$$r_{opt} = t_{opt} = \frac{2l^2 - L^2 + Ll}{2l}$$

In the previous example we have:
k$_{opt}$=2.3;
r$_{opt}$=t$_{opt}$=0.222 m.
It can be seen that this optimal value of k:
Is to be compared to the relationship $$k_{opt} = 1 + \frac{L}{l} = 1 + \frac{M_{gap}}{l_{min}}$$

I.e. the one allowing a gap of length L to be provided between two packages transferred consecutively according to the direction of their width 1.
But that it does not guarantee the relationship:
L+i−r+t<L$_3$ or (L+l<L$_3$
(where L$_3$ is the length of the third belt) to ensure the presence of a single perfectly isolated "row" on said third belt.
The previous relationship leads to a value of k such that:

$$k = \frac{L_3}{l}$$

It should be noted that this value of k is equal to k$_{opt\ when}$ L$_3$=L+1
In conclusion, V$_2$ is programmed so that:

$$V_2 = V_1 \cdot \left(1 + \frac{L}{l}\right)$$

either:

$$1 \leq \frac{L}{l} \leq 2 \text{ or: } 2 \leq \frac{V_2}{V_1} \leq 3$$

With limit values that lead to
L=1 (square-based package) r$_{opt}$=t$_{opt}$=1
L=2.1 (strict interleaving). r$_{opt}$=t$_{opt}$=0
This makes it possible to obtain a deinterleaving of packages 98 and 99 on pallet 100 as shown in FIG. 13, on the third belt 16.
Then this applies to V$_3$
V$_3$=β·V$_2$ With β being a multiplying factor taken to allow the further optimization of the package spacing determined experimentally as a function of 1, L of the package. For example, β=1.35.

We will now describe the algorithmic steps for determining the orders of the following fourth, fifth and other conveyor belts, with particular reference to FIGS. 14A, 14B, 15 and 16.

The problem that the invention is trying to solve is to supply the downstream method with a constant (one by one) package pace from a supply of successive rows at a constant pace.

However, the number of packages belonging to two rows of the same given layer of packages is not necessarily constant, either because of the arrangement of the rows or because of the interleaving thereof.

The purpose of the operating principle of this (line-forming) device 1 is therefore to regulate the supply of the pick-up station 5 by making the speed VX of the conveyors or belts 17, 18, 19, 20, 22 depend on the number of packages Nb_Colis of the row present on the third belt 16 as well as on the position of the packages located at the ends of the Pos_Colis_Ext and Pos_Colis_Int row.

More precisely and with reference to FIG. 14B, once the position of the outside package (entry 101), the position of the inside package (entry 102), the number of packages (entry 103) and after detection (entry 104) of the presence of the row or the series on said third belt has been obtained by digital photography of the camera M above the third belt, the speed V$_3$ (arrow 106) is determined (square 105).

The signal 107, which supplies the calculation 108, so-called "line consumer", on a periodic event (signal 109) is then calculated from the results.

The speeds V$_4$, V$_5$, V$_6$ and V$_7$ are then deduced (110, 111, 112, 113) therefrom.

The speed V$_4$ is reinserted (arrow 114) into the calculation block 115 estimating the distance remaining to be covered by each package, which can in turn (link 114) be reinjected into the calculation block 105 to allow the optimization of distance management in real time or almost in real time in order to avoid the risks of collision and/or traffic jams between packages (refresh time 117 for example every 20 milliseconds).

In block 105 and after acquiring the data produced by the CCD image sensor, the load centre is positioned according to the O-X,Y mark (see also FIG. 15).

The length of the paths travelled by the outermost package (D$_{ext}$) and the innermost package (D$_{int}$) is then calculated.

Then the speed (V$_{xr+1}$) that will have to be applied to row r+1 when the last package in row r is evacuated, is calculated. The condition for releasing the row r+1 is then evaluated with a formula of the type:

$$D_{int} - E_{est} > V_{xr+1} + 3600$$

with
E$_{est}$: estimation of the position of the outermost package in the row r, carried out periodically in 115 (cf. FIG. 14B) with a periodicity of 20 ms for example.

If the "releasing" condition is met, row r1 is released onto the fourth conveyor 17 at speed V$_3$. All the packages of the same row are released at the same time.

Otherwise, the third belt stops.

The block 108, also called a line consumer, is programmed as follows.

Start or initialization of speeds.
V$_4$=V$_5$=V$_6$=V$_7$=V$_{xr}$=V$_{Def}$=V-current With $V_{Def}$: the speed chosen by default and entered in 118 (parameters) into the system.

Cycle:

$V_4 = V_5 = V_6 = V_7 = V_{xr+1} = V_{-current}$

The elements for calculating the paths are shown in FIG. 15, where the path of a package is equal to the sum of the paths defined in a known manner as a function of the width $L_1$ of the belts and the lengths $L_2$, $L_3$ (a, b, c), $L_4$, $L_5$, $L_6$, $L_7$ and the angles α, α', with:

$L_1$: width of the third and fourth belts,
$L_2$: length of the right part of the fourth belt,
$L_4 = L_5$: length of the outer side of the fourth and fifth belts.
$L_3 = L_5 - a$ with a=distance between the attachment point of ramp B and the beginning of the sixth belt, b and c: parameters defined below.
$L_6$: length of the longest side of the sixth belt.
$L_7 - L_4$: length of the longest side of the seventh belt.

α Angle between the outer sides between the fourth and fifth conveyor belts and the sixth and seventh conveyor belts, respectively.

In view of FIG. 15, two cases should be considered:
The path interferes with guide B.
The path does not interfere with guide B.

Each of these paths for a package located at a distance of $\delta_0$ from the outer edge of the third belt can be modelled by a line of the following type $Path_i (\delta_0) = a_i \delta_0 b_i$ by applying the conventional cumulation and trigonometry rules.

For example, a table showing the measurements of the values of parameters a and b is given below and also with reference to FIG. 15, where the width $L_1$ of the belts is 1350 mm, the distance L2 is 400 mm and $L_4$=1016 mm.

b is here the distance between the edge of the sixth belt 19 and the point of impact of the straight path, parallel to said side, of package $\delta_0$ with guide B.

TABLE

| | With an interference | | With no Interference | |
|---|---|---|---|---|
| Segment | a | b [m] | a | b [m] |
| Path0 | 0.00 | 0.40 | 0.00 | 0.40 |
| Path1 | 1.00 | 0.00 | 1.00 | 0.00 |
| Path2 | −4.14 | 6.61 | 2.00 | 2.21 |
| Path3 | 5.24 | −3.68 | 0.00 | 0.00 |
| Path4 | 0.00 | 1.18 | 1.00 | 0.48 |
| $\sum_{i=0}^{i=4} Path_i$ | 2.10 | 4.51 | 4.00 | 3.09 |

This gives:
Path $(\delta_0)$=2.10 $\delta_0$+4.51 without interference
Path $(\delta_0)$=4.00 $\delta_0$+3.09 without interference FIG. 16 shows the path followed by the package as a function of the initial distance $\delta_C$ of the package on the third belt without interference (120) with the guide (up to $\delta_0$=0.65) and with interference (121) with the guide (after).

The third conveyor belt 16 was then more precisely represented in perspective (in FIG. 17) with only one package on the row that is about to leave to the fourth conveyor belt 17.

The gaps 122 on the left (Dint) and 123 on the right ($_{Dext}$) are measured by the CCD sensor or camera 124 located above.

More precisely, the camera or sensor is located above the third belt, with the analyzed area being a rectangle:

The CCD (chip 4/3) then defines an oriented reference mark (o, x, y) for example
176 pixels along x
132 pixels along y
with o being the centre of the CCD image The installation height H of the 3D sensor is determined relative to the "surface" to be analysed, for example with an $\widehat{x0x'}$=60° angle of opening, $\widehat{y0y'}$=45° angle of opening, width of the third belt for example=1,350 and maximum product height for example Hprodmax=0.4 m, then the various parameters are calculated by applying the trigonometric rules.

FIG. 18 shows the CCD camera 124 positioned (adjustable) at height H above the packages 4, 4', 4" on the third conveyor belt to take the photographs and provide the PLC with the required geometric data.

FIGS. 19A, 19B and 19C show the angles a that may exist between directions 10 and 12, between a first conveyor assembly and a second conveyor assembly and/or a second conveyor assembly and/or a second assembly and a third conveyor assembly (and/or between an n−1 assembly and n assembly . . . ).

FIG. 19A shows an angle $\alpha_1$ of 120°, FIG. 19B an angle $\alpha_2$ of 90° and FIG. 19C an angle $\alpha_3$ of up to 30°.

These angles will make it possible to determine the speed to be chosen according to the distances and the number of packages placed on the belts.

In addition, rounds 130, 130'; 131'; 130"; 131" represent portions of two packages which follow two parallel paths materialized by lines forming angles $\alpha_1$, $\alpha_2$ and $\alpha_3$.

Depending on the distances Δ between these two paths, the respective speeds Vy and VX of the angle parts of the first and second conveyor assemblies and the angle, the operating parameters are then determined using simple trigonometric calculation rules.

An example of how to implement the method for transferring and aligning packages according to the embodiment of the invention, more particularly described here, will now be described with reference to FIGS. 20A, 20B, 20C and 20D.

From a layer 140 of packages which is positioned on a first belt 14 with a first speed $V_1$, the second belt 15 with a second speed $V_2 > V_1$ is advanced. As a result, the successive rows 141 and 142 of packages separate, with the row 142 then arriving first on the third conveyor belt 16 where it is photographed in order to determine the number and distance $D_{ext}$ and $D_{int}$ of the end packages, with the third conveyor belt being stopped.

These values are transmitted to the ECU 29, which then determines the sequence of operations as described above.

Figure 20A:
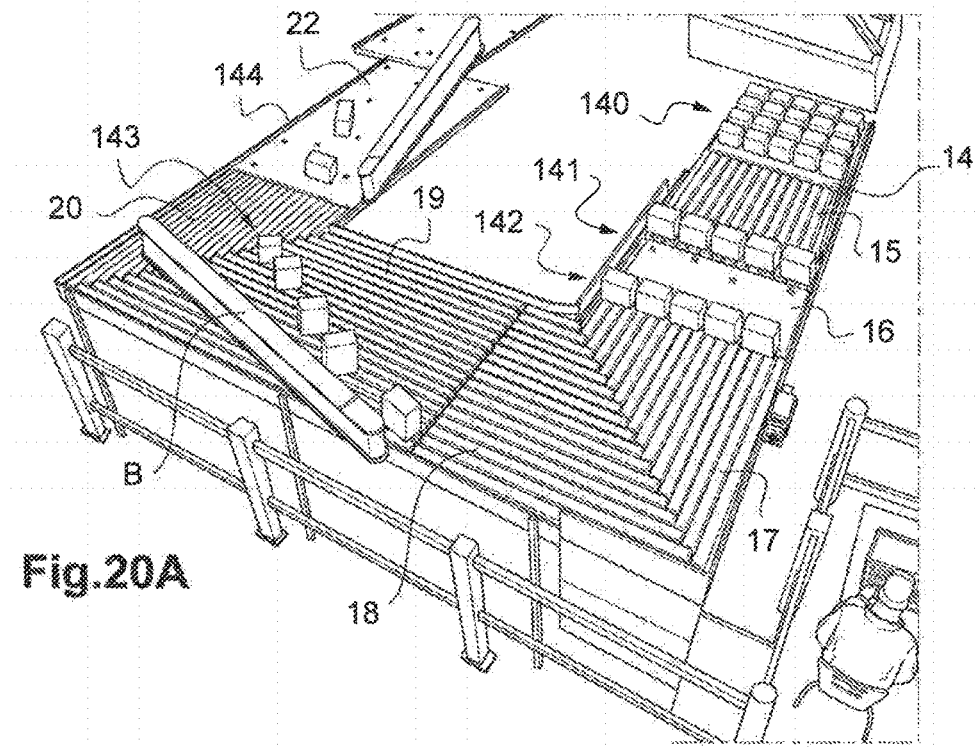
Figure 20B:
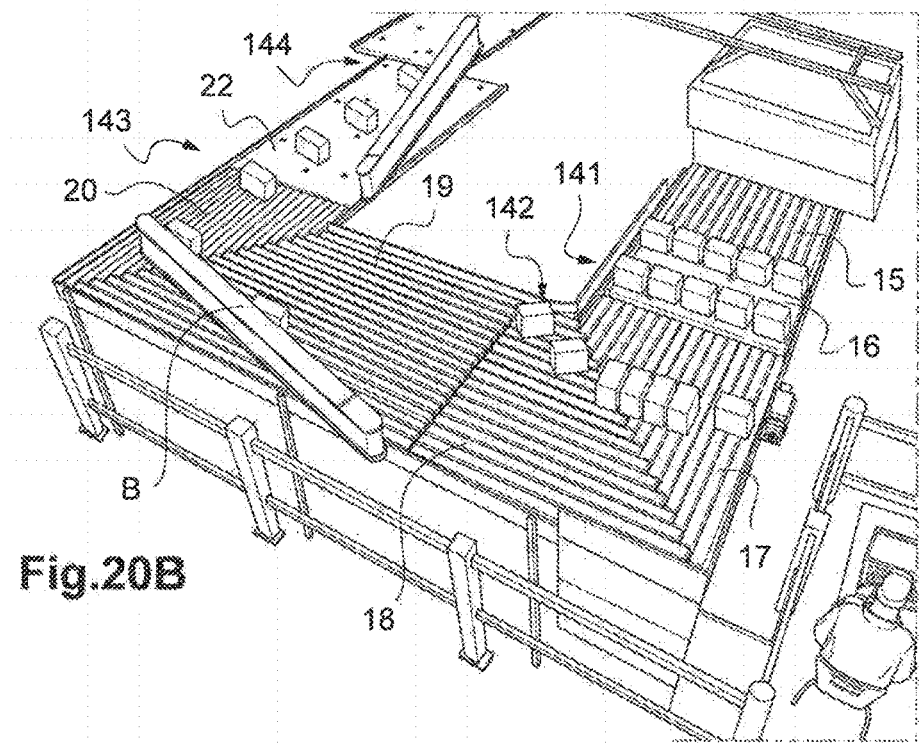

Based on these calculations, the row 142 is injected into the fourth belt which begins to spread the packages apart near the inner side of the belts (see FIG. 20B).

It should be noted that the moment of release of the row 142 onto the fourth belt 17 does concern all the packages of this row.

Figure 20C:
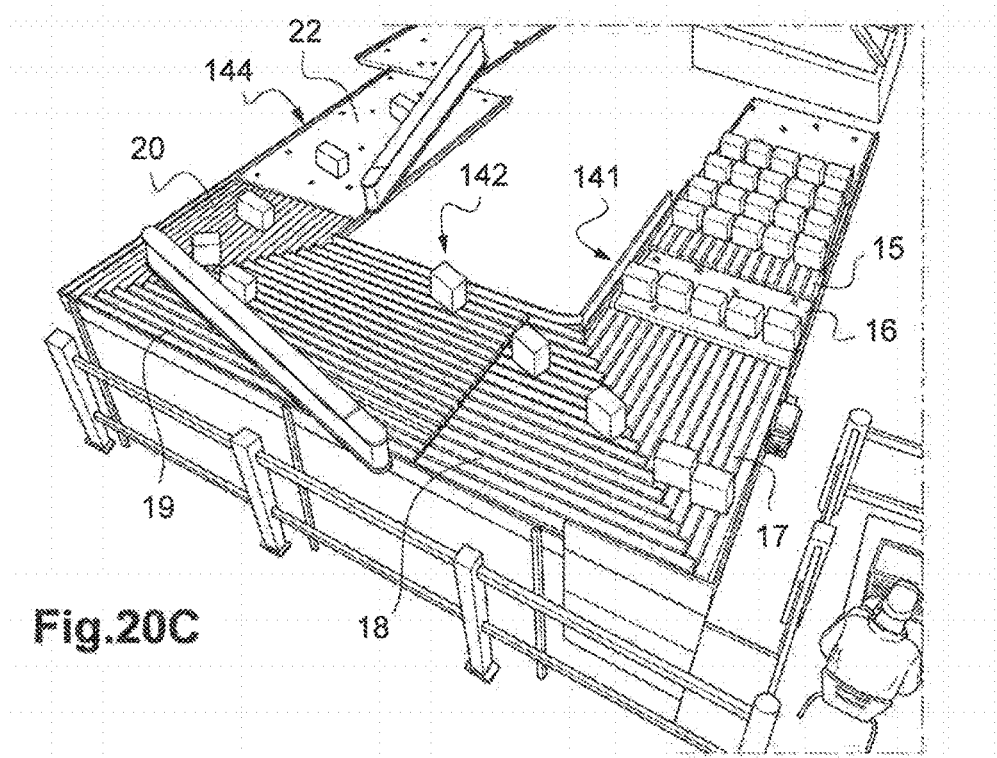
Figure 20D:
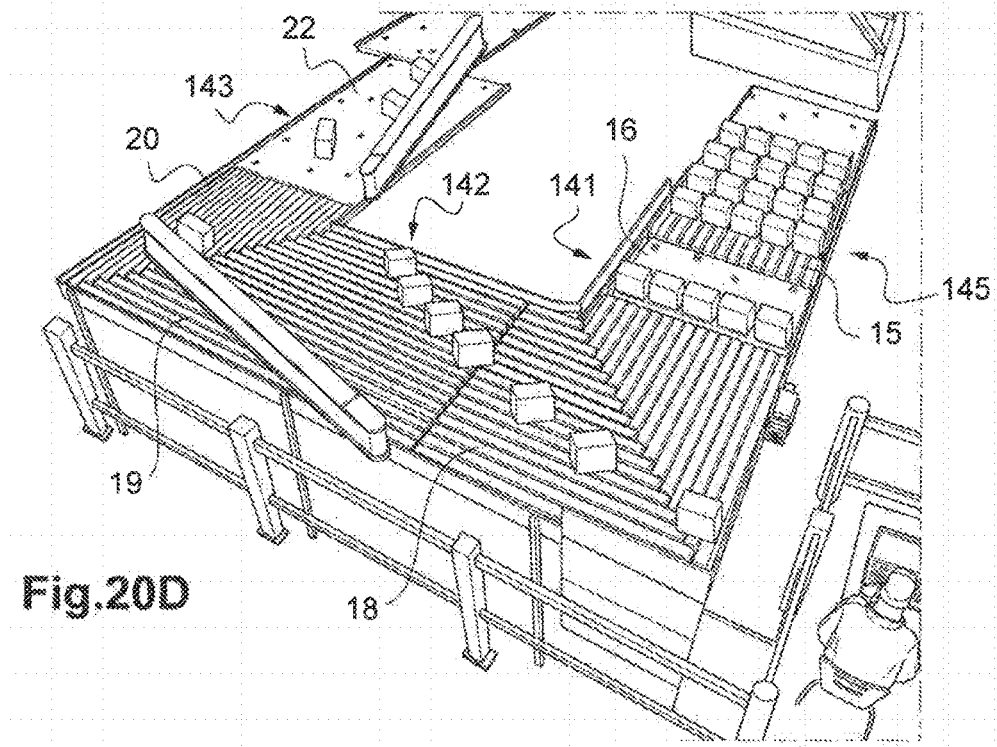

Depending on the distance of the packages from the inner edge and taking into account the angle α, the outermost packages are gradually taken up and spread out as shown in FIGS. 20C and 20D.

The outermost packages (143) then (back to FIG. 20A) slip along the guide B if necessary, which allows the products to be repositioned in a single file as shown again in FIG. 20B.

Thanks to appropriate programming and management of speeds, measurements on the third belt, and the dimensional manufacturing parameters of the device, it is thus possible to obtain an optimized, regulated and constant pace of isolated packages on the eighth belt and beyond.

As it goes without saying and as it also results from the foregoing, the present invention is not limited to the embodiments more particularly described. On the contrary, it covers all the alternative solutions, in particular those where other stationary or mobile guide ramps are positioned, for example, on the second conveyor unit, and/or the guide ramps are not motorised.

The invention claimed is:

1. A method for transferring and presenting in a longitudinal or a substantially longitudinal line in a transfer direction of packages that were initially arranged in rows i ( . . . , n−1, n, n, n+1, . . . ), in a direction transverse to the transfer direction, at a determined isolated-package pace D using at least three successive conveyor belts including a regulating conveyor belt and two line-forming conveyor belts, the method comprising:
after separating rows that are adjacent in a longitudinal direction from one another,
presenting each row i in turn onto the regulating conveyor belt,
measuring, by an optical measuring device, dimensions of spaces between end packages of said row i and reference inside and outside dimensions with respect to said regulating conveyor belt and a number of packages of row i on said belt,
calculating from said measurements, using a calculator,
a speed of the line-forming conveyor belts to maintain the determined pace D,
paths of the packages, and
a moment at which to release the packages of said row i from the regulating belt onto said line-forming conveyor belts, as a function of said calculations so that a package of row i does not catch up with a package of row i−1, and
advancing said row i on the line-forming conveyor belts at the determined moment of release.

2. The method according to claim 1, wherein, in order to separate the adjacent rows in the longitudinal direction, the packages are deposited in horizontal layers, each layer comprising at least two packages of rows i, i+1, on a first receiving conveyor belt transporting the packages together in a first direction at a determined first speed $V_1$, and
the deposited packages are advanced on a second conveyor belt for transfer in the first direction at a second speed $V_2>V_1$, with the regulating belt, having a sequenced speed $V_3$, forming a third belt downstream of said first and second belts.

3. The method according to claim 2, wherein the velocity $V_1$ is selected according to the number N of packages in the layer.

4. The method according to claim 2, wherein the packages of at least two adjacent rows are interleaved.

5. The method according to claim 2, wherein the speed ratio $V_2/V_1$ is chosen according to the dimensions of the packages in length L and width l, and of a determined spacing dimension E of separation or minimum gap between packages, with the spacing dimension E of separation or minimum gap between packages being the one that is desired to be systematically complied with between two adjacent packages of two different adjacent rows.

6. The method according to claim 2, wherein the second row i+1 is advanced onto the second belt only when all the packages of the previous row i have reached a determined position with respect to an inlet of said second belt.

7. The method method according to claim 2, wherein the line-forming conveyor belts comprise
a fourth belt driven at a fourth speed $V_4$ determined to increase the separation in the longitudinal direction of said rows from each other, and
a fifth belt forming an angle α with the first direction and driven at a speed $V_5$, in a second direction,
said fourth and fifth belts are supplied, so that a path length of the packages which were initially located in the direction transverse to the first direction is different.

8. The method according to claim 7, wherein the fourth belt is supplied by conditioning the speed $V_4$ and $V_5$ of the fifth belt on the number of packages of row i present on the third belt and on the relative position of the end packages of row i with respect to the reference inside and outside dimensions.

9. The method according to claim 7, wherein each package located beyond a determined distance from an inner edge of the fifth belt is straightened by a guide ramp B at an angle to the direction of transfer at an angle γ, so that said packages are brought back inside said fifth belt.

10. The method according to claim 7, wherein the angle α ranges from 90° to 150°.

11. The method according to claim 7, wherein the packages are advanced onto at least one additional conveyor assembly in a third direction or substantially in a third direction forming a second angle with the second direction of the fifth belt.

12. The method according to claim 1, wherein each package is straightened with respect to a determined horizontal plane in an identical position for gripping by at least one motorized guide ramp, obliquely to the transfer direction B at an acute angle β with respect to one of the edges of the conveyor and a pivoting system is actuated if necessary, in order to position the packages always in the same direction with respect to the respective longitudinal axis of the packages.

13. A device for transferring and presenting packages in a longitudinal line in a direction of transfer thereof to a packages pick-up station, in which the packages are deposited in layers, each layer comprising at least two rows of transverse packages in the direction of transfer, the device comprising:
a first receiving conveyor belt transporting the packages together in a first direction at a first speed $V_1$;
a second conveyor belt for the transfer in said first direction at a second speed $V_2>V_1$, so that a separation results in the longitudinal direction between a first row i or a first transversely aligned series of at least one package and at least a second row i+1 or a second transversely aligned series of at least one package due to the difference in speed;
a third belt movable in translation in a sequenced manner to be stopped prior to supplying a fourth belt;
an optical measuring device optically measuring X-Y positions of the packages of said row or series, a number of packages of said row i and a spacing between the packages of the row i and/or separating end packages on internal and external sides of the third one from the external and internal edges of said third belt when stationary;
a movement system configured to advance the third belt at a third speed $V_3$, and configured to stop the third belt in a sequenced manner;
a fourth belt and a fifth belt, the fourth belt positioned as an extension of the third belt and configured to be driven by a determined fourth supplying speed $V_4$ to supply the fifth belt forming an angle to the first direction and configured to be driven at a fifth speed $V_5$, in a second direction, so that there is a difference in the path length of the packages initially located in a direction transverse to the first direction;

a calculator configured to calculate the speeds $V_1$, $V_2$, $V_3$, $V_4$, $V_5$ and to determine a moment of introduction of the packages onto the fourth belt from determined parameters including dimensions of the packages, a length and a width of the belts, a number of packages per layer, spacing dimensions, and a number of packages per row i measured optically, as to allow separating a string of packages into a longitudinal or substantially longitudinal line of the packages at a determined isolated-package pace D and without risk of collision during transfer thereof at a pace D.

14. The device according to claim 13, further comprising a complementary conveyor assembly for a transfer in a third direction or substantially in a third direction forming a second angle a with the second direction of the fifth belt.

15. The device according to claim 13, wherein the fifth belt comprises a ramp B at an angle to the direction of transfer, to guide the packages.

\* \* \* \* \*